US010860016B1

(12) United States Patent
Wang et al.

(10) Patent No.: US 10,860,016 B1
(45) Date of Patent: Dec. 8, 2020

(54) AUTOMATED SITE BASED MISSION PLANNING SYSTEM

(71) Applicant: Robo Industries, Inc., Houston, TX (US)

(72) Inventors: Liang Wang, Houston, TX (US); Linli Zhang, Houston, TX (US)

(73) Assignee: Robo Industries, Inc., Houston, TX (US)

( * ) Notice: Subject to any disclaimer, the term of this patent is extended or adjusted under 35 U.S.C. 154(b) by 232 days.

(21) Appl. No.: 15/258,619

(22) Filed: Sep. 7, 2016

(51) Int. Cl.
*G05D 1/00* (2006.01)
*G05D 1/02* (2020.01)

(52) U.S. Cl.
CPC ......... *G05D 1/0088* (2013.01); *G05D 1/0027* (2013.01); *G05D 1/0219* (2013.01); *G05D 1/0223* (2013.01)

(58) Field of Classification Search
None
See application file for complete search history.

(56) References Cited

U.S. PATENT DOCUMENTS

| | | | | |
|---|---|---|---|---|
| 2011/0295423 A1* | 12/2011 | Anderson | ............ | G05D 1/0088 700/248 |
| 2013/0311031 A1* | 11/2013 | Friend | ................... | E02F 9/2054 701/26 |
| 2017/0314232 A1* | 11/2017 | Chi | ........................ | E02F 9/2054 |
| 2018/0137446 A1* | 5/2018 | Shike | .................... | E02F 9/2054 |

* cited by examiner

*Primary Examiner* — Jonathan M Dager
*Assistant Examiner* — Garrett F Evans
(74) *Attorney, Agent, or Firm* — Lee & Hayes, P.C.

(57) ABSTRACT

Generation and assignment of tasks based on a pre-generated and updateable mission may be utilized to reduce risk and dangers associated with allowing multiple autonomous vehicles to operate within a site. In some cases, the site may be divided into sub-regions with particular vehicles assigned, paths and segments as horizontal divisions of the sub-region and layers as vertical division of the sub-region. The vehicles may then be assigned to a perform operations related to tasks associated with a sub-region, path or segment, and layer.

20 Claims, 26 Drawing Sheets

AUTOMATED SITE BASED MISSION PLANNING SYSTEM

BACKGROUND

The presence of autonomous vehicles in today's world is becoming more and more common. However, in the field of work vehicles the autonomous control requires more than just determining a position and movement of a vehicle. Therefore, autonomous control of work vehicles is typically reserved for a finishing stage following the leveling of the terrain by an operator controlled vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
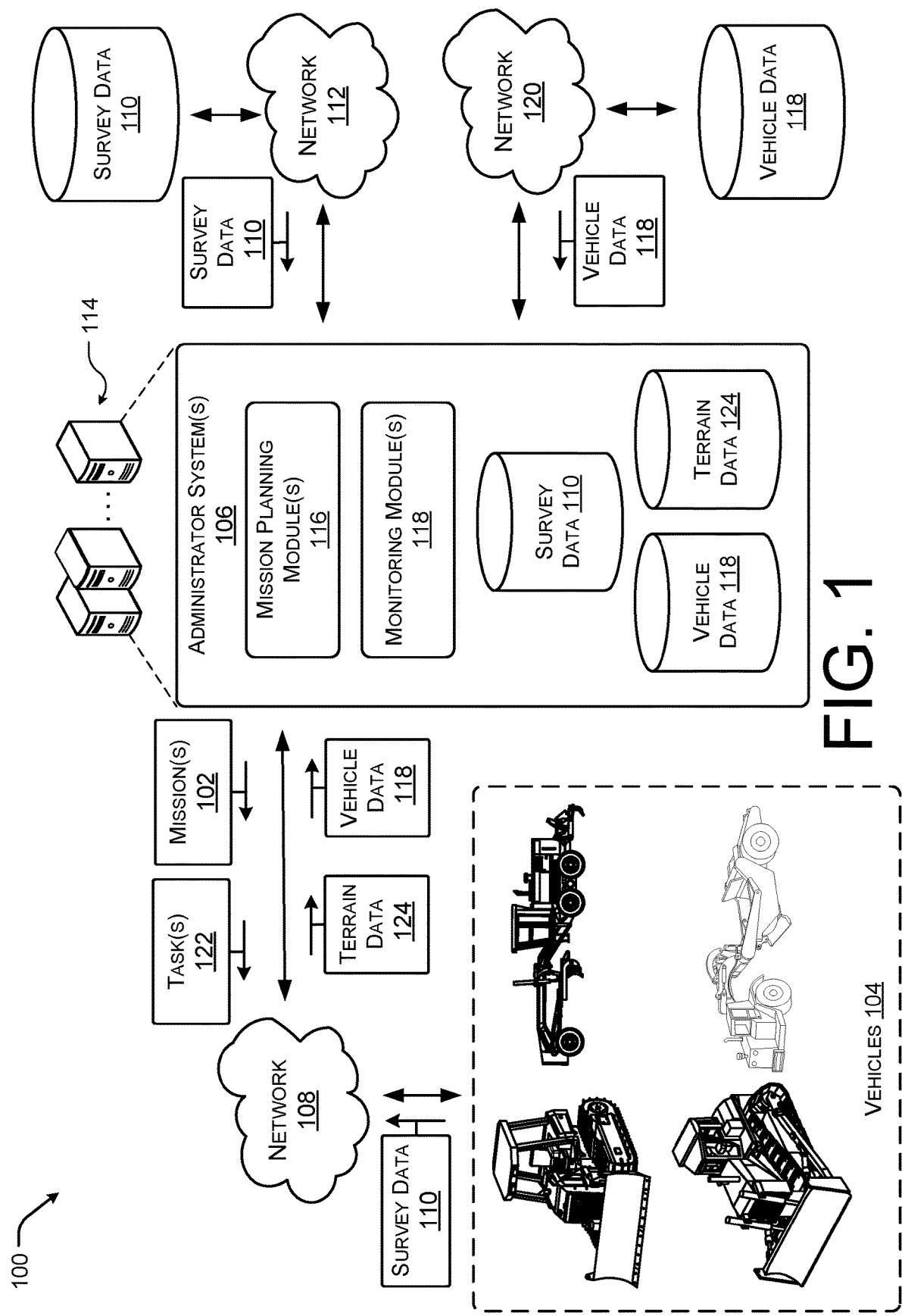
FIG. 1 illustrates an example system for generating and providing missions to one or more autonomous vehicles operating on a site according to some implementations.

This disclosure includes techniques and implementations for defining a mission and associated tasks to be performed by one or more work vehicles on a job site. The mission and associated tasks may be utilized by autonomous vehicles to coordinate operations on the site in order to achieve an objective (such as leveling, grading, removing mineral bearing material, constructing ramps, etc.). In some implementations, an initial mission may be generated using survey data collected by survey stations, survey poles, aerial survey units, or one or more of the work vehicles. The mission may be updated based on information and data collected by the work vehicles as tasks are completed and operations associated with each task are performed in real-time or near real-time.

As described herein, a mission may be generated for a site. The site may be divided into sub-regions sized such that one or more vehicles may perform one particular task at a particular time. For example, a bulldozer may level the terrain within a sub-region or a backhoe may work in conjunction with a rock truck to remove material from a sub-region. Each of the sub-regions may be further divided into paths (horizontal regions) and layers (vertical regions). In some cases, the width of the paths and the height of the layers may be selected based on information associated with the vehicles assigned. For example, the width of an implement of a bulldozer assigned to the sub-region may be utilized to define the width of the path such that the bulldozer may perform an operation on the path without making multiple passes.

Each of the paths may be further divided into segments based on the vehicles assigned and the depth of each layer. For example, a bulldozer may be able to operate up to a maximum load on the implement. If the depth of the layer and the length of the path result in a load over the maximum, the path may be divided into multiple segments to allow the bulldozer to operate without exceeding the maximum load. In some cases, the site may also include no-entrance or restricted areas that the vehicles are intended to avoid. For example, the restricted areas may include permanent obstacles, such as rocks, rivers, or standing water) or other environments a vehicle is unable to operate in. In other cases the restricted areas may be temporary, such as to designate a parking area, temporary offices, rest areas, or housing areas that may move as the tasks of the mission are completed.

In some cases, the vehicles may include various sensors, positioning units, and/or the angle acquisition units. The various sensors, positioning units, and/or the angle acquisition units may be utilized to collect data associated with the site as the vehicles perform the operations associated with tasks. The data collected may be utilized to update or adjust tasks, subsequent tasks, or other parts of a mission. For example, a bulldozer may determine that the vehicle is only able to clear two inches of material per pass, rather than the four inches called for in the mission. Thus, the number of layers and the number passes for each path may be adjusted accordingly utilizing feedback from the vehicle.

In some cases, multiple vehicles may be operating within the same sub-region of the site. In these cases, as well as when unexpected obstacles are detected, the vehicles may perform preventative measures to reduce the danger associated with autonomous vehicles operating on a site (particularly when a human is present). The vehicles described herein, may include sensors, image components, or other devices capable of detecting the presence of objects within a predefined distance of the vehicle. In some cases, the detection area may be divided or segmented into four regions, left detection zone, right detection zone, front detection zone, and rear detection zone. An alert zone may be defined within the detection area and a brake zone may be defined within the alert zone. Thus, the vehicle may detect an object within the detection zone, attempt to alert the object to the presence of the vehicle when the object enters the alert zone, and stop when a vehicle enters the brake zone.

For example, if a first vehicle operating in coordination with a second vehicle enters the detection area of the second vehicle, the second vehicle may attempt to determine if a collision is likely. If the first vehicle also enters the alert zone, the second vehicle may broadcast an alert or notification to the first vehicle. If the first vehicle does not respond and enters the brake zone, the second vehicle may stop or apply the brakes. If, however, the first vehicle does respond, the two vehicles may coordinate operations to perform a task.

In some cases, the position, size, and range of the alert zone and the brake zone may vary depending on the conditions, direction, and velocity of the vehicle. In some cases, the brake zone may be extended in the forward direction as the vehicle increases in velocity. For instance, the faster the vehicle drives or accelerates, the longer or larger the brake zone or alter zone may be to allow for sufficient time to mitigate risk of an impact. Similarly, the faster the vehicle steers or turns, the wider the zone. In another case, the brake zone and alert zone may be extended to the right of the vehicle and reduced to the left of the vehicle as the vehicle performs a right hand turn. Similarly, the alert zone and brake zone may be extended toward the rear and reduced in the front when the vehicle is moving in reverse.

FIG. 1 illustrates an example system 100 for generating and providing a mission 102 to one or more autonomous vehicles 104 operating on a site according to some implementations. For example, the vehicle 104 may be equipped with a control unit to monitor and control the vehicle's 104 power delivery system, brake system, steering system, and implement controls, etc.

In the illustrated example, an administrator system 106 is in communication with a control unit (not shown) of each of the vehicles 104 via a network 108. In general, the administrator system 106 may collect survey data 110 of a site at which the vehicles 104 are assigned to generate a mission 102 including tasks that are assigned based on divisions of the site including sub-regions, paths, layers, restricted areas, and segments. The survey data 110 may be retrieved from a database via a network 112, stored on a computer-readable media or memory associated with the administrator system 106, or received from the site by a survey device. For instance, the survey device may include a survey station, survey pole, other ground based survey tool, aerial based survey tool, or from scanning and position devices and systems installed on the vehicles 104 themselves. For example, one or more of the vehicles 104 may traverse the site to collect the survey data 110.

The administrator system 106 may be implemented by one or more servers, such as servers 114. Additionally, the servers 114 may host any number of modules to receive input, collect data, and generate missions 102. In some cases, the modules may include a mission planning module 116, among others. In some cases, the administrator system 106 may also include monitoring modules 118 that allow an operator remote from the vehicle 104 to monitor the operations of the vehicles 104 while tasks are performed.

In some cases, the administrator system 106 may select one or more of the vehicles 104 to perform tasks using vehicle data 118 either stored on the administrator system 106 or accessed via network 120. In other cases, each of the vehicles 104 may send the vehicle data 118 to administrator system 106 in addition to or in lieu of the stored or accessed vehicle data 118. In the current example, the networks 108, 112, and 120 are shown as different networks. However, in some instances, the networks 108, 112, and 120 may be the same network, such as the Internet.

In one particular example, the administrator system 106 may establish a communication channel with each of the vehicles 104 selected to perform tasks as part of the mission 102 prior to finalizing the mission 102. In this example, the administrator system 106 may send diagnostic test instructions to the control unit on the vehicle 104 to engage the navigation controls and collect vehicle data 118 associated with the functionally or health of the vehicle 104.

Once an initial mission 102 is generated based on the survey data 110 and the vehicle data 118, the administrator system 106 may send the mission 102 and/or tasks 122 associated with the mission 102 to the designated vehicles 104. For example, the mission 102 including all tasks 122 may be provided to each vehicle 104 or the tasks 122 of the mission 102 may be provided to individually assigned vehicles 104.

The vehicles 104 may begin to perform the tasks 122 on the sub-regions, paths, and segments of the site as indicated by the mission 102. As the vehicles 104 perform the operations associated with each task 122, the vehicles 104 may collect terrain data 124 associated with the actual conditions of the site. Thus, each of the vehicles 104 may provide terrain data 124 as well as updated vehicle data 118 to the administrator system 106 as operations are performed. The administrator system 106 may update individual tasks 122, sub-regions, paths, segments, and the overall mission 102 based on the terrain data 124 and the vehicle data 118 received and re-provide the mission 102 and the tasks 122.

Figure 2:
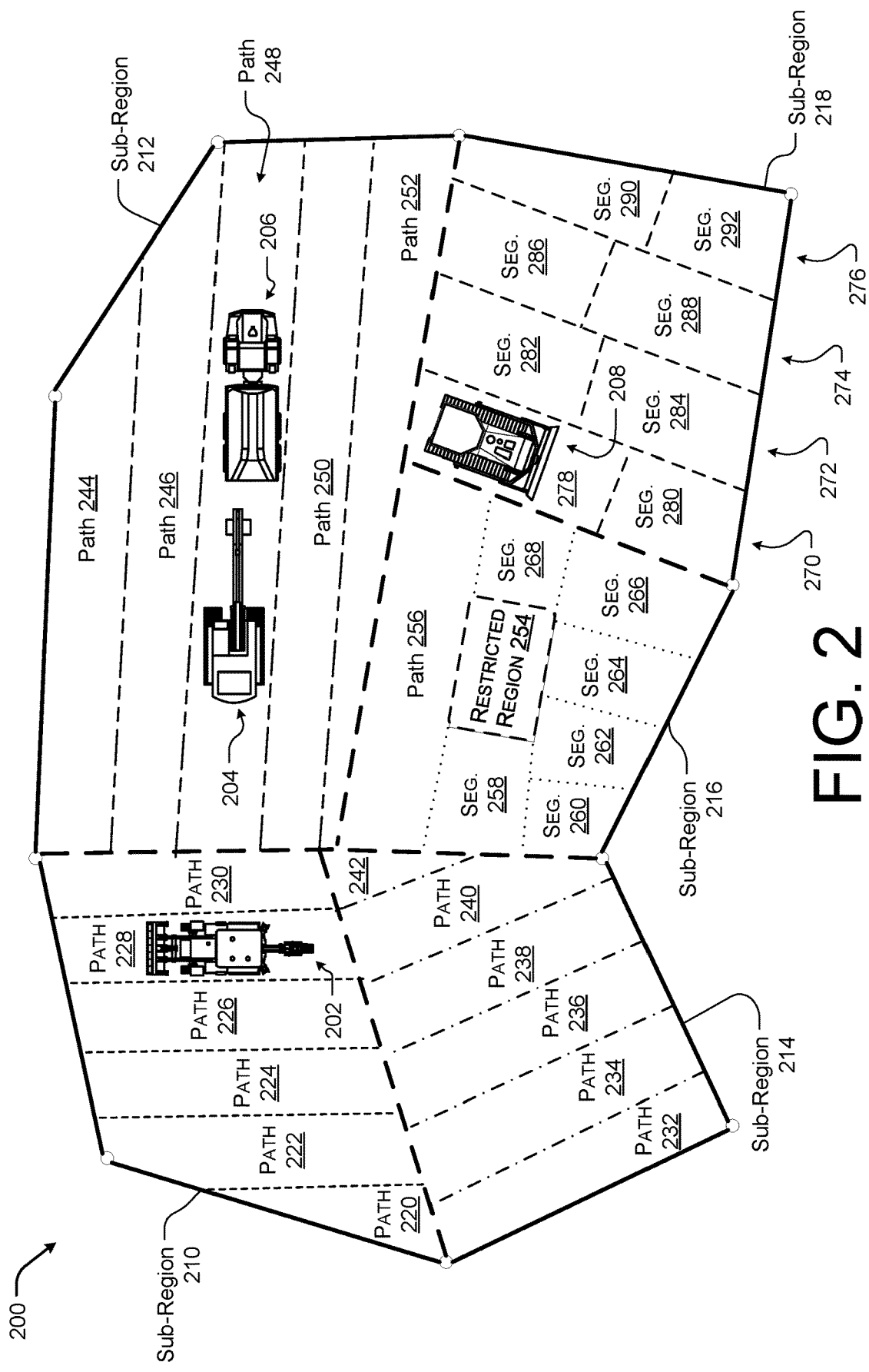
FIG. 2 is an example mission overlaid on a site illustrating example vehicles performing operations according to some implementations.

FIG. 2 is an example mission overlaid on a site 200 illustrating example vehicles 202, 204, 206, and 208 performing operations according to some implementations. In the illustrated example, the site 200 is divided into five sub-regions 210-218. For example, an administrator system may divide a site into the five sub-regions 210-218 by evaluating the total size of the site and a desired working space per vehicle. In one specific instance, a vehicle may be able to safely perform operations on fifteen acres and if the site is 75 acres, then the administrator system may divide the site into the five sub-regions 210-218.

Each of the sub-regions 210-218 may be further divided into paths and segments. As discussed above, a width of a path may be defined based on the size of the implement or capabilities of the vehicle assigned to operate on the sub-region 210-218 and the segments may be a division of a path again based on the capabilities of the vehicle assigned. For instance, the size of a segment may be based on a maximum or desired load of a vehicle.

In the illustrated example, the sub-region 210 is divided into six paths 220-230. In this example, the bulldozer 202 has been assigned to perform operations such as leveling the sub-region 210. Thus, the width of the paths 220-230 is selected based on the size of the blade implement on the bulldozer 202, such that each of the paths 220-230 may be leveled in one pass of the bulldozer 202. Similarly, the sub-region 214 includes paths 232-242. For instance, the bulldozer 202 may complete tasks associated with sub-region 210 and move to the sub-region 214.

The sub-region 212 has two vehicles 204 and 206 assigned to operate in cooperation. For example, the vehicle 204 is an excavator and the vehicle 206 is a rock truck. The vehicles 204 and 206 may be assigned to the sub-region 212 to remove material (e.g., the excavator 204 loads material into the rock truck 206 to be hauled away). The sub-region 212 has been divided into paths 244-252. For example, the vehicles 204 and 206 may work through each path 244-252 clearing and hauling away material.

The sub-region 216 currently has no vehicles assigned but includes a restricted region 254. The restricted region 254 is an area of the site 200 that may include a permeant obstacle, such as a lake, pond, rock formation; an area that has been set aside for humans, cars, buildings, etc.; or other area that the vehicles 202-208 should avoid. Thus, to assist the vehicles 202-208 to avoid the restricted area, the sub-region 216 is divided into path 256 and segments 258-268.

The sub-region 218 is another sub-region being leveled. In this case, the bulldozer 208 has been assigned to level the sub-region 218. In this example, the sub-region 218 is divided into paths 270-276 having a width based on the width of the blade implement of the bulldozer 208. However, in this case, the bulldozer 208 may be unable to handle the load that would be exerted on the bulldozer 208 if the bulldozer 208 covered the entire length of the paths 270-276. Thus, each of the paths 270-276 has been divided into two segments 278-292 to enable the bulldozer 208 to operate under reduced loads.

Figure 3:
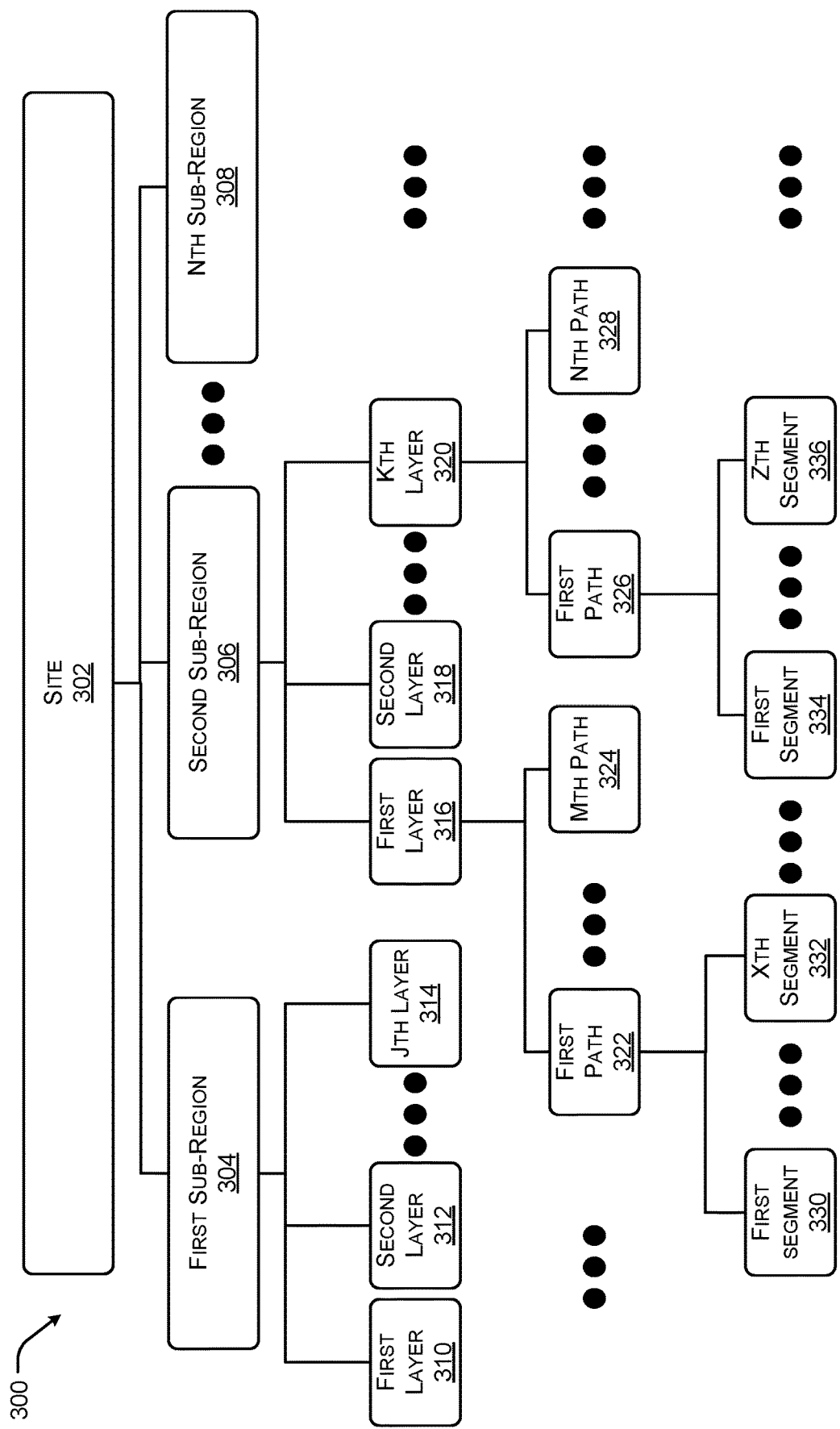
FIG. 3 is an example mission organized by tasks according to some implementations.

FIG. 3 is an example mission 300 organized by tasks according to some implementations. As discussed above, the mission 300 is divided into tasks that may be performed by one or more vehicles on a particular segment or path for each vertical layer of material. In the illustrated example, a site 302 is divided into three sub-regions 304-308. Each of the three sub-regions 304-308 are divided into layers 310-320 and paths 322-328. Each of the layers 310-320 represent a vertical division of the sub-regions 304-308 and each of the paths 322-328 represent a horizontal division of the sub-regions 304-308. Additionally, each of the paths 322-328 may include one or more segments, generally indicated by 330-336.

In the illustrated example, the mission 300 is organized such that one or more vehicles may perform operations associated with the tasks in a recursive manner by navigating up and down the example tree structure. For instance, the vehicle may be assigned to a sub-region 304-308 and perform tasks associated with the leaf nodes of the tree starting within one of the segments 330-336. In the illustrated example, the layers 310-320 are placed above the paths 322-328 within the tree structure representing the mission 300. For example, a bulldozer may remove materiel from a sub-region 304 layer by layer to prevent risks of injury or damage to the vehicles based on difference in height associated with each path 322-328. For instance, if a vehicle removed multiple layers along one path 322-328 without keeping the terrain of the other paths 322-328 level the likelihood that a vehicle becomes stuck or damaged by falling off the uneven terrain is increased.

For instance, in one particular example, a vehicle may be assigned to perform operations on the second sub-region 306. The vehicle may first select the task associated with the segment 330. Thus, the vehicle may perform operations associated the segment 330. The vehicle may proceed to complete tasks associated with the segments 330-332 of path 322 until the tasks associated with the Xth segment 332 is complete. Once the tasks associated with the segments 330-332 are complete, the vehicle will have completed the tasks associated with the path 322. The vehicle may then advance to perform operations associated with the task of path 324. If the path 324 had segments the vehicle would complete tasks of each segment. However, in the illustrated example, the path 324 does not include any segments. Thus, the vehicle may perform operations associated with the task of path 324.

Once the operations associated with the task of path 324 are completed, the tasks associated with the layer 316 are complete. In this situation, the vehicles may proceed to perform operations on the next layer 318 of the sub-region 306. It should be understood, that the paths and segments associated with the layer 318 may be the same as the paths 322-324 and segments 330-332 of the layer 316, as the layer 318 is associated with operations to be performed at a higher or lower height on the same terrain as the first layer 316 depending on the tasks performed by the vehicles. For example, if the vehicle is a bulldozer and the vehicle removed material to lower the terrain (or level the terrain) of the sub-region 306 when performing operations associated with layer 316. The bulldozer may remove additional material to further lower the same terrain when performing operations associated with the layer 318. The vehicle may thus continue to perform operations and complete tasks until tasks associated with the Kth layer 320 are completed. In this case, the tasks associated with the sub-region 306 will have been completed and the work on the sub-region may be finished.

In the example above, a single vehicle completes the tasks associated with the sub-region 306. However, it should be understood that multiple vehicles may be assigned to the sub-region 306 to complete tasks in cooperation. Similarly, different vehicles may perform operations associated with each individual segment, path, or layer depending on the tasks to be completed. For instance, a motor grader may perform finishing operations associated with the Kth layer 320 while a bulldozer may perform initial operations associated with leveling the terrain during the layer 316.

Figure 4:
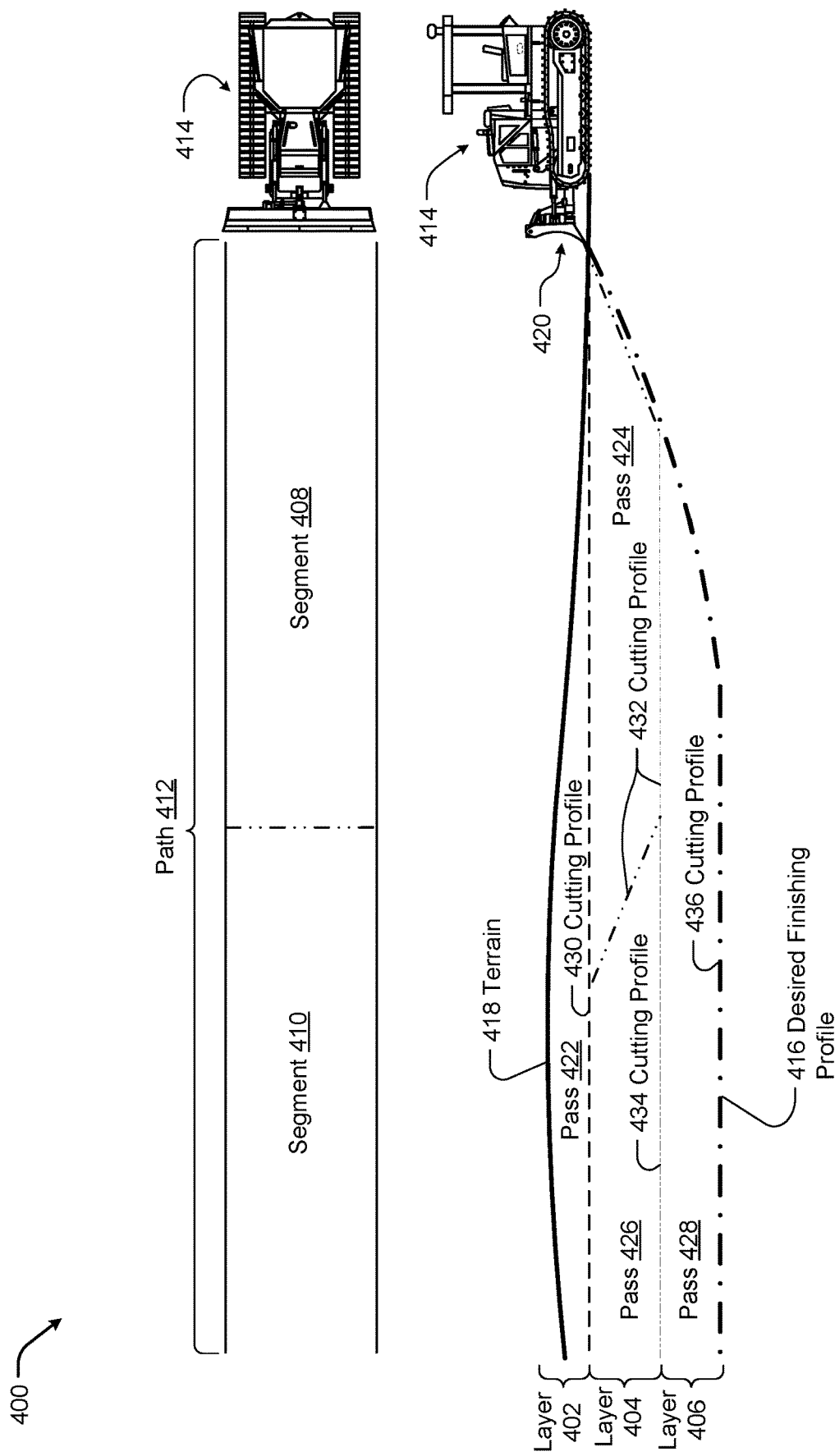
FIG. 4 is an example pictorial diagram showing layers and segments associated with a path according to some implementations.

FIG. 4 is an example pictorial diagram 400 showing layers 402-406 and segments 408 and 410 associated with a path 412 according to some implementations. In the current example, the vehicle 414 has been assigned to remove material associated with the path 412 to achieve a desired finishing profile 416. For instance, the vehicle 414 may be performing an operation to shape the terrain 418 in a manner to achieve the desired finishing profile 416 using the implement 420. Unfortunately, the vehicle 414 may be unable to move the amount of terrain 418 required to achieve the finishing profile 416 in one pass along the path 412 or via one cut. Therefore, the tasks associated with the path 412 have been divided into the layers 402-406 and segments 408 and 410, such that the vehicle may perform multiple passes 422-428 along the path 412 to remove the material.

Initially, the vehicle 414 using the implement 420 may make a straight cut according to the first pass 422 along the path 412 to remove the material associated with the top layer 402. For example, an estimated load associated with moving the material above a first cutting profile 430 is expected to be less than a threshold load amount. Thus, the first pass 422 on the path 412 may include a pass over the entire length of the path 412.

Once the first pass 422 is completed, the vehicle 414 may return to make the second pass 424 according to a second cutting profile 432. On the second pass 424, the vehicle 414 may remove a second portion of the terrain 418 located between the first cutting profile 430 and the second cutting profile 432. Unlike the initial pass 422, during the second pass 424 the vehicle 414 may only remove material associated with the segment 408. For example, as the cutting profile 432 is deeper, the load on the implement 420 may be increased when compared with the first pass 422. Thus, the vehicle 414 may require two passes 424 and 426 to remove material within the second layer 404 along the full length of the path 412. Accordingly, the tasks associated with the second layer 404 may be divided into two segments 408 and 410 or two passes 424 and 426. The vehicle 414 may return again to make the third pass 426 or second attempt along the path 412 to remove the material associated with a third cutting profile 434 and complete the tasks associated with the second layer 404.

Finally, the vehicle 414 may make a final pass 428 along the path 412 according to a fourth cutting profile 436 to remove the material associated with the third layer 406. Thus, the vehicle 414 may remove a fourth portion of the terrain 418 located between the second cutting profile 432, the third cutting profile 434, and the fourth cutting profile 436, as shown.

Once the fourth pass 428 along the path 412 is complete, the vehicle 414 may have achieved the desired finishing profile 416. However, it should be understood that additional passes may be required to smooth or finalize the surface of the terrain 418 once the majority of the terrain 418 has been removed by the vehicle 414. Additionally, the smoothing or finalizing of the surface of the terrain 418 as well as the first four passes 422-428 may be performed by different vehicles or vehicles having different types of implements depending on the type of operation and the desired finishing profile 416.

Figure 5:
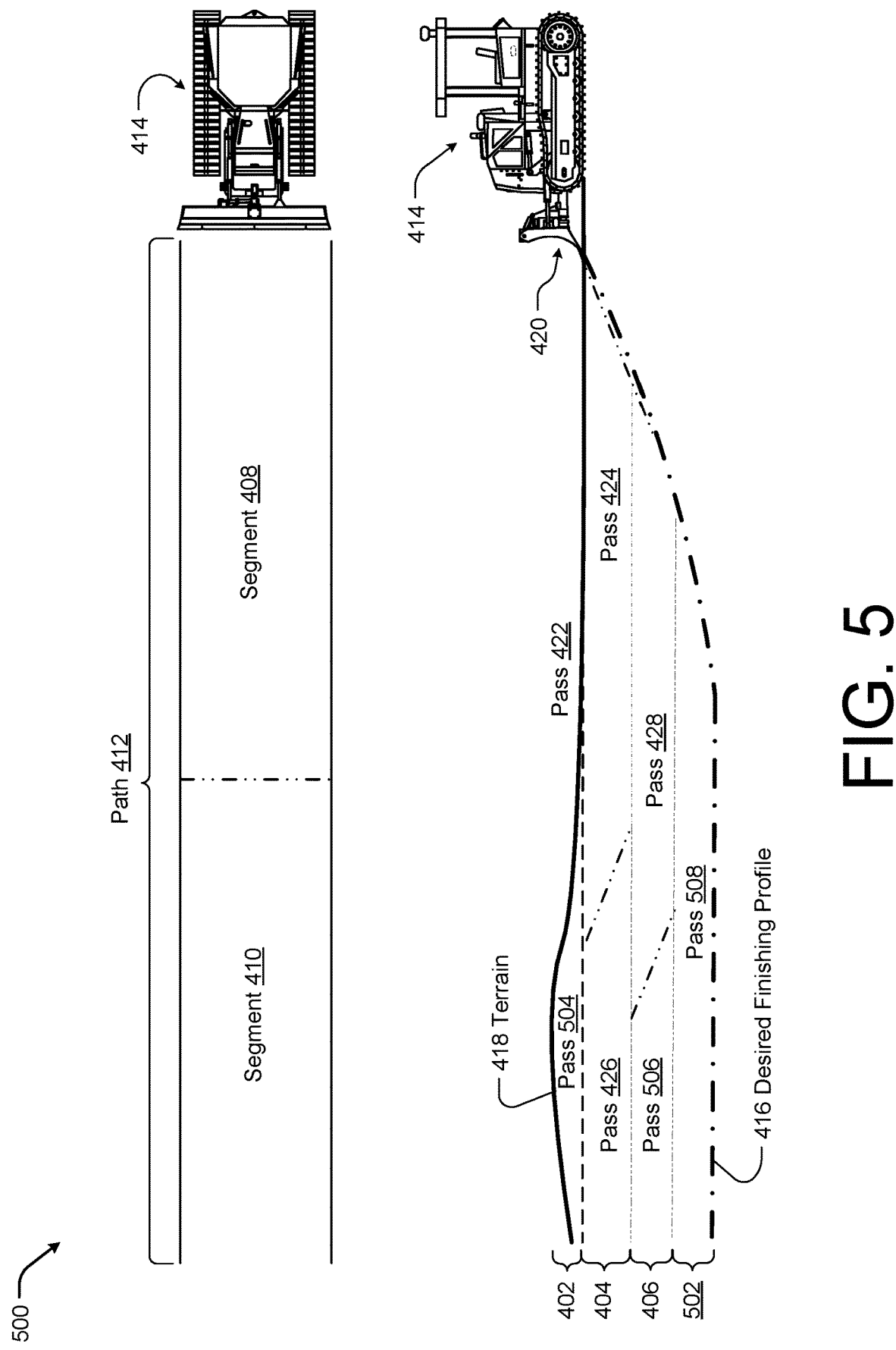
FIG. 5 is another example pictorial diagram showing layers and segments of FIG. 4 adjusted based on information related to the terrain collected during the first pass along the path according to some implementations.

FIG. 5 is another example pictorial diagram 500 showing layers 402-406 and 502 and segments 408 and 410 of FIG. 4 adjusted based on information related to the terrain 418 collected during the first pass 422 along the path 412 according to some implementations. For instance, the load on the implement 420 may have been greater than expected, due to for example, denser material within the terrain 418 than expected. Thus, on the first pass 422, the vehicle 414 did not remove all of the material associated with the layer 402, as expected.

In these situations, the vehicle 414 may report the issue or information to an administrator system to cause the administrator to adjust the mission starting with the current segment 408, path 412, and layer 402 working backward through the tree to adjust subsequent tasks. For instance, in the current example, the administrator system may add pass 504 within layer 402 to divide the path 412 within layer 402 into the two segments 408 and 410. The administrator system may then continue to update the mission by adding pass 506 within layer 406 to reflect each segment 408 and 410 as different tasks for the vehicle. Additionally, in the current example, the administrator system added a layer 502 by reducing the thickness or height of each of the layers 402-406 to reflect the increase in load caused by the material. In this example, the administrator system added the layer 502 having a single pass 508 along the path 412. However, in other instances, the administrator system may add two passes within the layer 502, one for each of the segments 408 and 410.

Figure 6:
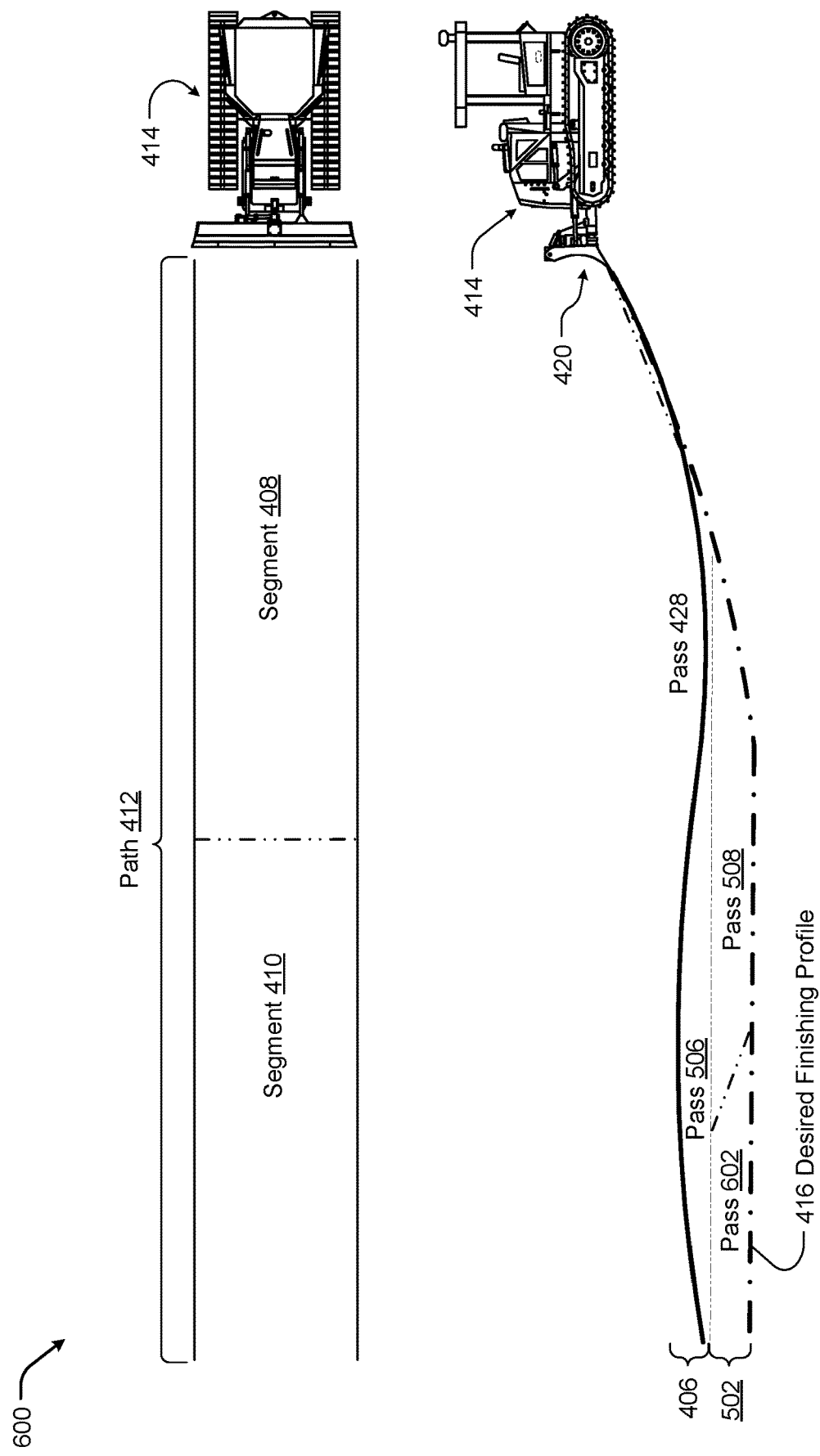
FIG. 6 is another example pictorial diagram showing layers and segments of FIGS. 4 and 5 adjusted based on information related to the terrain collected during the subsequent passes along the path according to some implementations.

FIG. 6 is another example pictorial diagram 600 showing layers 406 and 502 and segments 408 and 410 of FIGS. 4 and 5 adjusted based on information related to the terrain collected during the subsequent passes 424-428 and 504 along the path 412 according to some implementations. For instance, the load on the implement 420 may have continued to increase as the layers 402 and 404 were removed. Thus, on the pass 428, the vehicle 414 may determine that the load caused by the material associated with the layer 406 exceeds the load threshold.

In these situations, the vehicle 414 may again report the issue or information to an administrator system to cause the administrator system to adjust the updated mission starting with the current segment 408, path 412, and layer 406 working backward through the tree to adjust subsequent tasks. For instance, in the current example, the administrator system may add pass 602 within layer 502 to divide the path 412 within layer 502 into the two segments 408 and 410. The administrator system may then continue to update the mission by adding passes to other paths, such as paths adjacent to the path 412.

Figure 7:
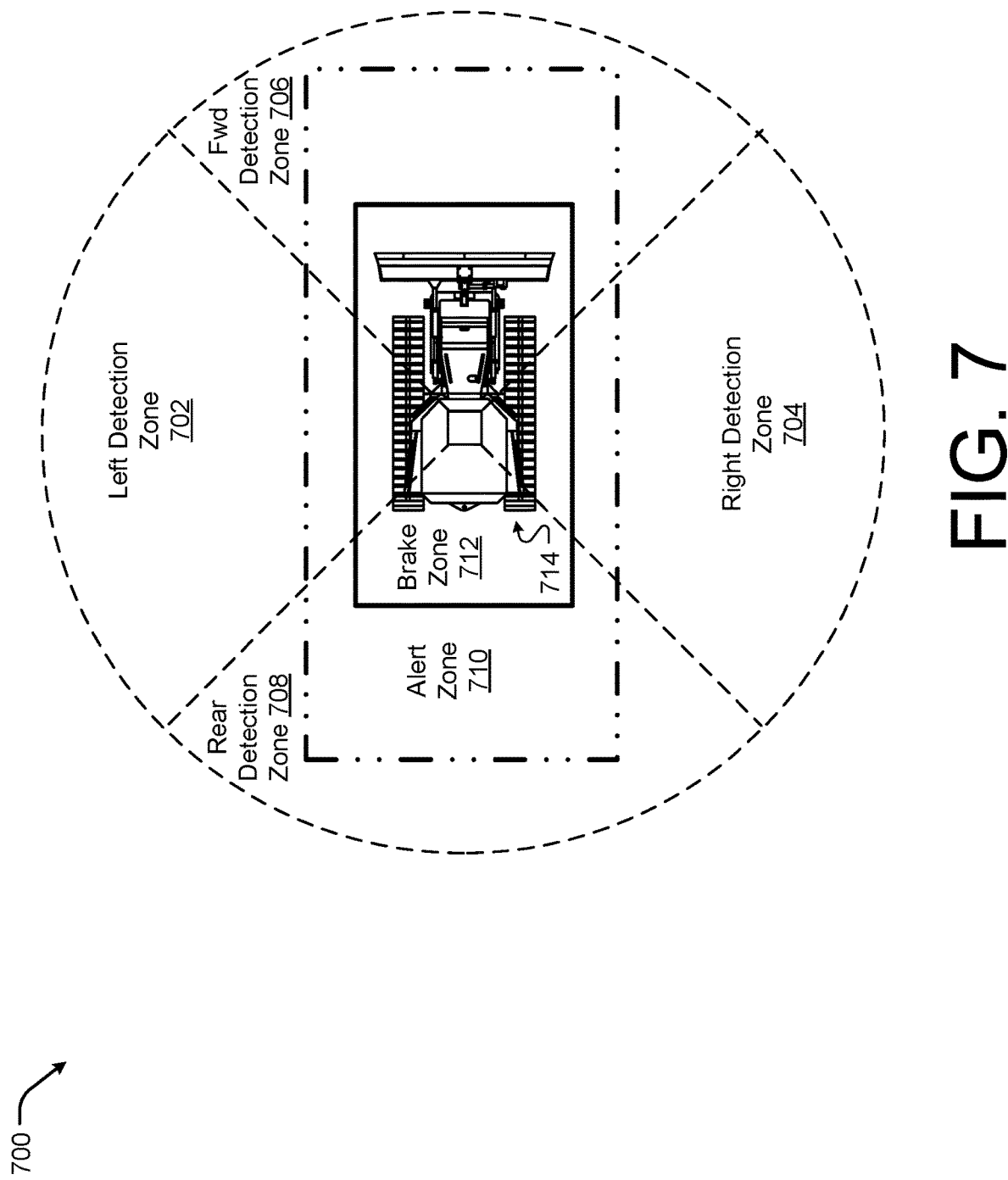
FIG. 7 is a top view of object detection zones, alert zones, and brake zones associated with a stationary vehicle according to some implementations.

FIG. 7 is a top view of object detection zones 702-708, alert zone 710, and brake zone 712 associated with a stationary vehicle 714 according to some implementations. As discussed above, the operations of the autonomous vehicles within a site may pose increased risks to other vehicles and humans coming into proximity with the vehicle 714. Thus, the vehicle 714 may include sensors, image components, or other devices capable of detecting the presence of objects within a predefined distance of the vehicle 714, such as the detection zones 702-708. In some cases, the detection area may be divided or segmented into four regions, left detection zone 702, right detection zone 704, front detection zone 706, and rear detection zone 708. In some cases, the left detection zone 702, right detection zone 704, front detection zone 706, and rear detection zone 708 may be fixed based on capabilities of the sensor systems installed on the vehicle 714.

Within the detection zones 702-708, the vehicle 714 may have an alert zone 710. The alert zone 710 may be defined as an area in which the vehicle 714 takes measures to notify the detected object to the presence of the vehicle 714. For example, the vehicle 714 may broadcast a message including direction of travel, position, and velocity when an object enters the alert zone 710. If the object is another vehicle operating with respect to the mission, the vehicle 714 may respond such that the vehicle 714 and the other vehicle may coordinate operations.

Within the alert zone 710, the vehicle 714 may define the brake zone 712. If the vehicle 714 detects an object within the brake zone 712, the vehicle 714 may apply the brakes or stop movement in an attempt to avoid the object. In the current example, if the vehicle 714 is stationary, the vehicle 714 may attempt emergency notification, such as broadcasting an emergency message, flashing lights, honking horns, etc. to alert the object to the presence of the vehicle 714.

Figure 8:
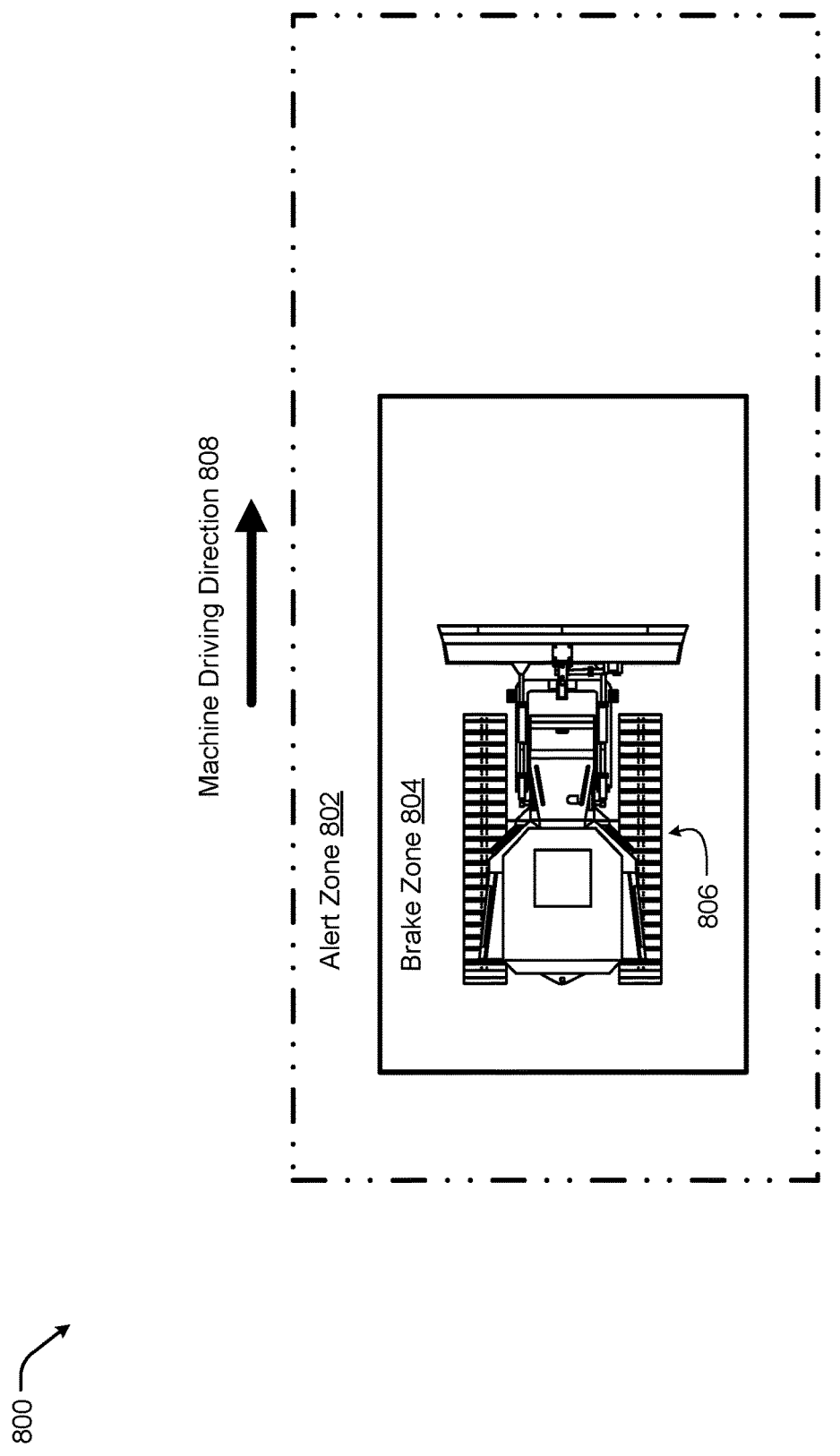
FIG. 8 is a top view of alert zones and brake zones associated with a vehicle moving in the forward direction according to some implementations.

FIG. 8 is a top view of alert zones 802 and brake zones 804 associated with a vehicle 806 moving in the forward direction 808 according to some implementations. In the illustrated example, the position and size (e.g., length and width or radius and diameter) of the alert zone 802 and the brake zone 804 is shifted with respect to the alert zone 710 and brake zone 712 of FIG. 7. For instance, in FIG. 7 the vehicle 714 was stationary. In the current example, the vehicle 806 is moving in the forward direction 808, thus the risks associated with impacting an object have increased in the space in front of the vehicle 806 and decreased in the space behind the vehicle 806 when compared with the vehicle 714. In other examples, the position and size of the alert zone 802 and the brake zone 804 may be shifted based on the vehicle driving direction, steering direction, turning direction, and/or velocity.

Accordingly, the vehicle 806 may be configured to adjust the position of the alert zone 802 and the brake zone 804 based on a direction and velocity of travel. Thus, the alert zone 802 and the brake zone 804 have been reduced in the rear of the vehicle 806 and increased in front of the vehicle 806, such that the vehicle 806 has a better opportunity of stopping prior to impacting an object detected in front of the vehicle 806.

Figure 9:
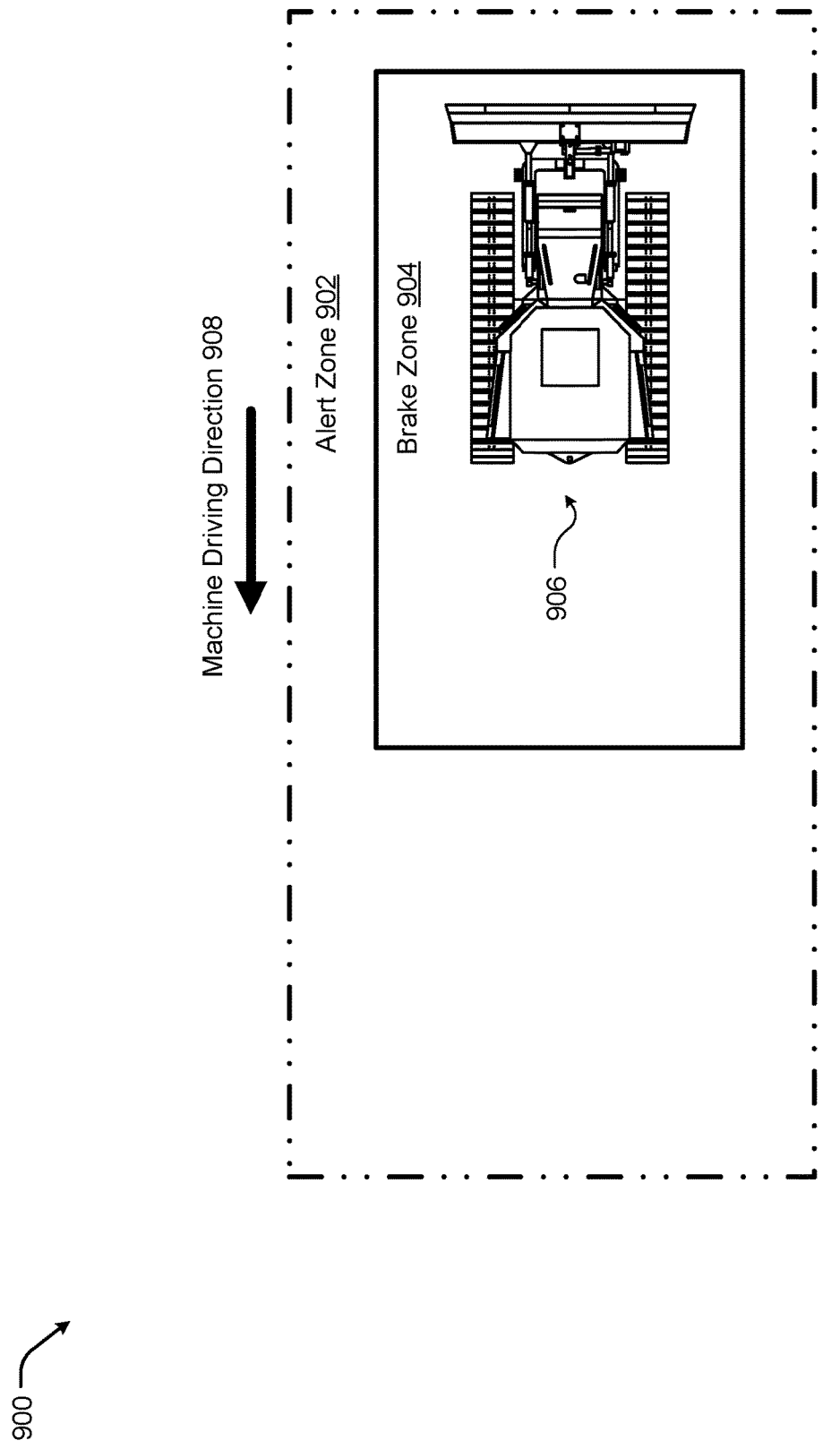
FIG. 9 is a top view of alert zones and brake zones associated with a vehicle moving in the backwards direction according to some implementations.

FIG. 9 is a top view of alert zones 902 and brake zones 904 associated with a vehicle 906 moving in the backwards direction 908 according to some implementations. In the illustrated example, the position and size of the alert zone 902 and the brake zone 904 is shifted with respect to the alert zone 710 and brake zone 712 of FIG. 7. For instance, in FIG. 7 the vehicle 714 was stationary. In the current example, the vehicle 906 is moving in the backwards direction 908, thus the risks associated with impacting an object have increased in the space behind the vehicle 906 and decreased in the space in front of the vehicle 906 when compared with the vehicle 714.

Accordingly, the vehicle 906 may be configured to adjust the position of the alert zone 902 and the brake zone 904 based on a direction and velocity of travel. Thus, the alert zone 902 and the brake zone 904 have been increased in the rear of the vehicle 906 and decreased in front of the vehicle 906, such that the vehicle 906 has a better opportunity of stopping prior to impacting an object detected behind the vehicle 906.

Figure 10:
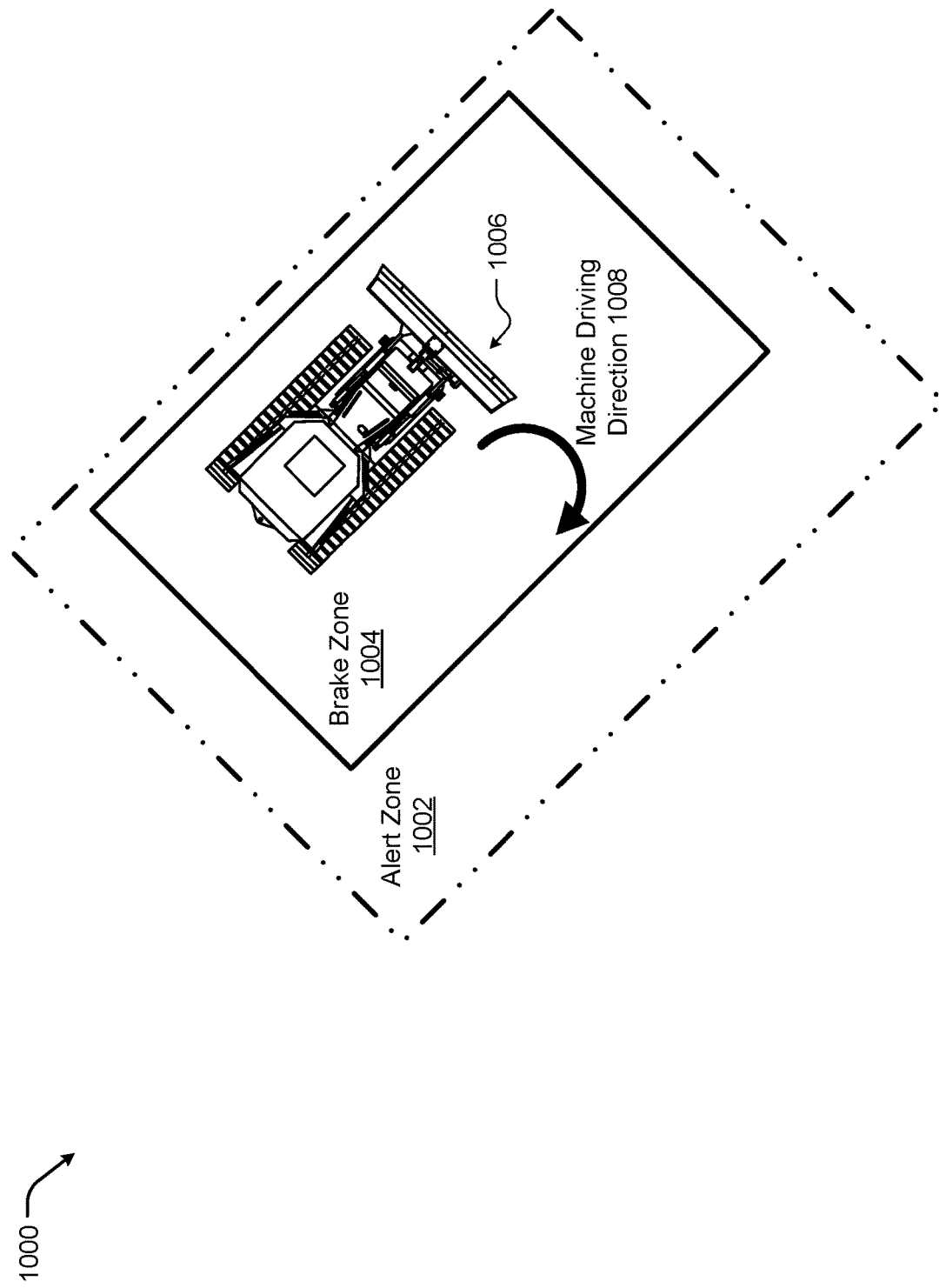
FIG. 10 is a top view of alert zones and brake zones associated with a vehicle turning to the right according to some implementations.

FIG. 10 is a top view of alert zones 1002 and brake zones 1004 associated with a vehicle 1006 turning to the right, generally indicated by 1008, according to some implementations. In the illustrated example, the position and size of the alert zone 1002 and the brake zone 1004 is shifted with respect to the alert zone 710 and brake zone 712 of FIG. 7. For instance, in FIG. 7 the vehicle 714 was stationary. In the current example, the vehicle 1006 is preforming a forward right-hand turn, thus the risks associated with impacting an object have increased in the space to the right and front of the vehicle 1006 and decreased in the space the rear and left of the vehicle 1006 when compared with the vehicle 714.

Accordingly, the vehicle 1006 may be configured to adjust the position of the alert zone 1002 and the brake zone 1004 based on a direction and velocity of travel. Thus, the alert zone 1002 and the brake zone 1004 have been increased in the front and to the right of the vehicle 1006 and decreased in rear and to the left of the vehicle 1006, such that the vehicle 1006 has a better opportunity of stopping prior to impacting an object detected to the right of the vehicle 1006.

Figure 11:
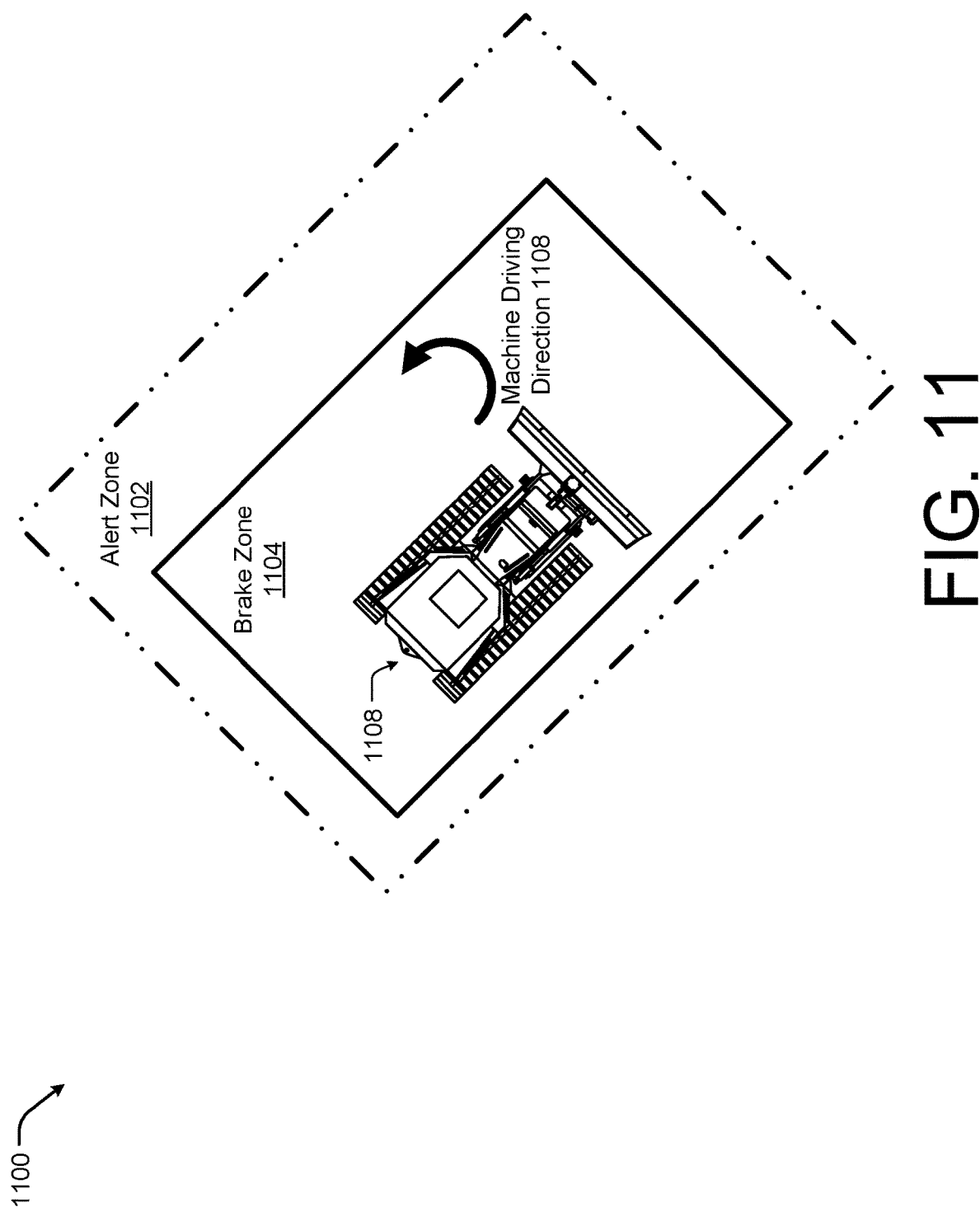
FIG. 11 is a top view of alert zones and brake zones associated with a vehicle turning to the left according to some implementations.

FIG. 11 is a top view of alert zones 1102 and brake zones 1104 associated with a vehicle 1106 turning to the left, generally indicated by 1108, according to some implementations. In the illustrated example, the position and size of the alert zone 1102 and the brake zone 1104 is shifted with respect to the alert zone 710 and brake zone 712 of FIG. 7. For instance, in FIG. 7 the vehicle 714 was stationary. In the current example, the vehicle 1106 is preforming a forward left-hand turn, thus the risks associated with impacting an object have increased in the space to the left and front of the vehicle 1106 and decreased in the space the rear and right of the vehicle 1106 when compared with the vehicle 714.

Accordingly, the vehicle 1106 may be configured to adjust the position of the alert zone 1102 and the brake zone 1104 based on a direction and velocity of travel. Thus, the alert zone 1102 and the brake zone 1104 have been increased in the front and to the left of the vehicle 1106 and decreased in rear and to the right of the vehicle 1106, such that the vehicle 1106 has a better opportunity of stopping prior to impacting an object detected to the left of the vehicle 1106.

FIGS. 12-25 are flow diagrams illustrating example processes associated with generating and updating a mission for a site and performing operations associated with the mission via autonomous vehicles on the site according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures, or environments.

Figure 12:
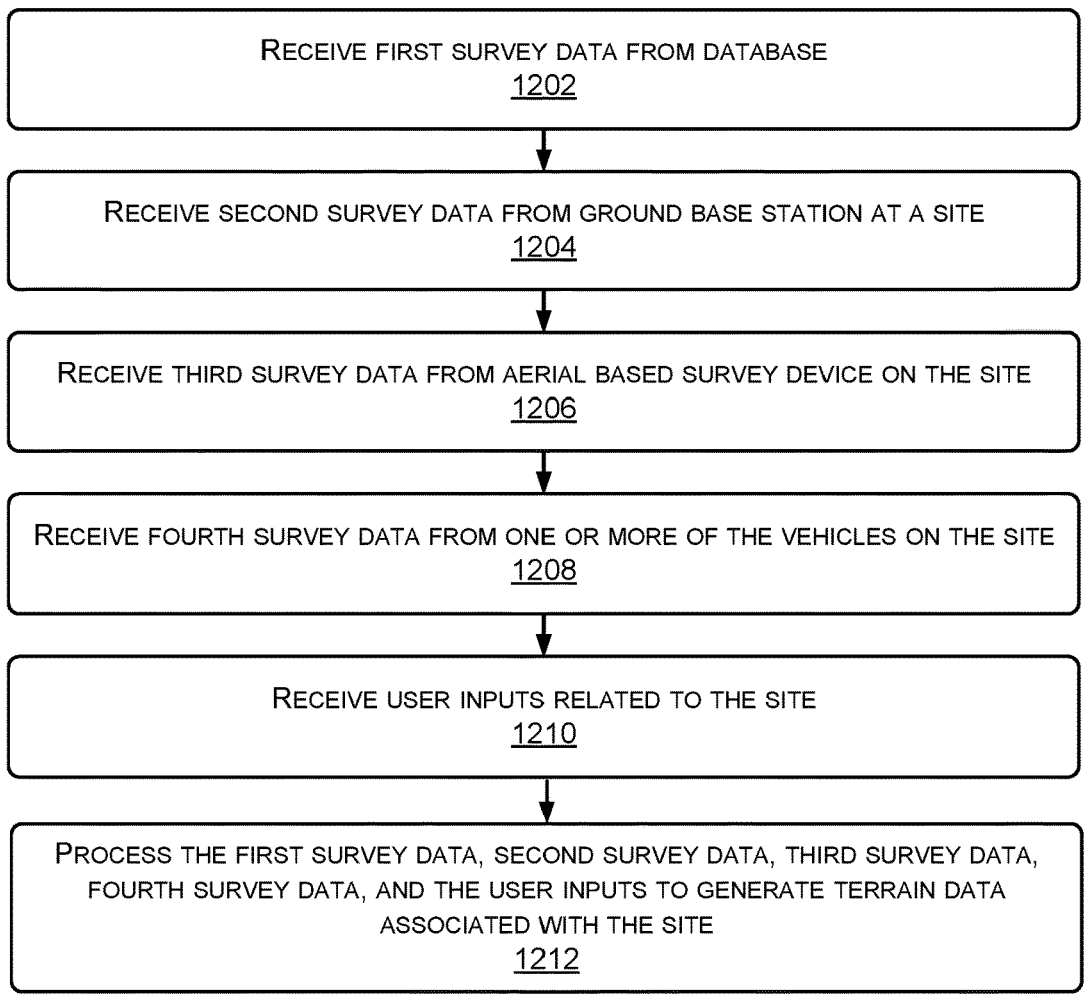
FIG. 12 is an example flow diagram showing an illustrative process for generating terrain data associated with a site according to some implementations.

FIG. 12 is an example flow diagram showing an illustrative process 1200 for generating terrain data associated with a site according to some implementations. For instance, as discussed above, an administrator system may generate a mission for a site based on survey data collected on site, stored in association with the administrator system, or accessible via a third party system. The survey data may be converted into terrain data and/or supplemented with additional terrain data collected by the autonomous vehicles prior to or during operations on the site.

At 1202, the administrator system receives first survey data from a database accessible to the administrator system. For instance, the survey data may be publicly available, privately available via a survey company, or stored on a server operating in conjunction with the administrator system.

At 1204, the administrator system receives second survey data from a ground base station operating on the site. For example, a survey pole may be placed at various locations around the site to scan the terrain and thereby collect the second survey data.

At 1206, the administrator system may receive third survey data from an aerial based survey device operating above the site. For example, a drone or other remote controlled vehicle equipped with imaging technology may be used to traverse the space above the site and collecting image data and/or survey data. The image data and survey data may then be provided to the administrator system.

At 1208, the administrator system may receive fourth survey data from one or more vehicles on the site. For example, the vehicles may drive or traverse the site collecting image data, sensor data, height and elevation data, etc. In one particular instance, the vehicle may use position data (collected via a satellite or Global Position system) and sensor data collected by one or more Internal Measurement Units.

At 1210, the administrator system may also receive user input related to the site. For example, an operator may enter data related to a restricted area, such as a parking lot, building, or other obstacles to be avoided by the autonomous vehicles.

At 1212, the administrator system may process the first survey data, the second survey data, the third survey data, the fourth survey data, and the user inputs to generate terrain data associated with the site. For example, the administrator system may combine the survey data from each of the sources to generated terrain data that more accurately represents the physical condition of the site than any one of the surveys.

In the current example, the administrator system receives the first survey data, the second survey data, the third survey data, and the fourth survey data. However, it should be understood that the administrator system may receive the survey data from some or all of the sources described above.

Figure 13:
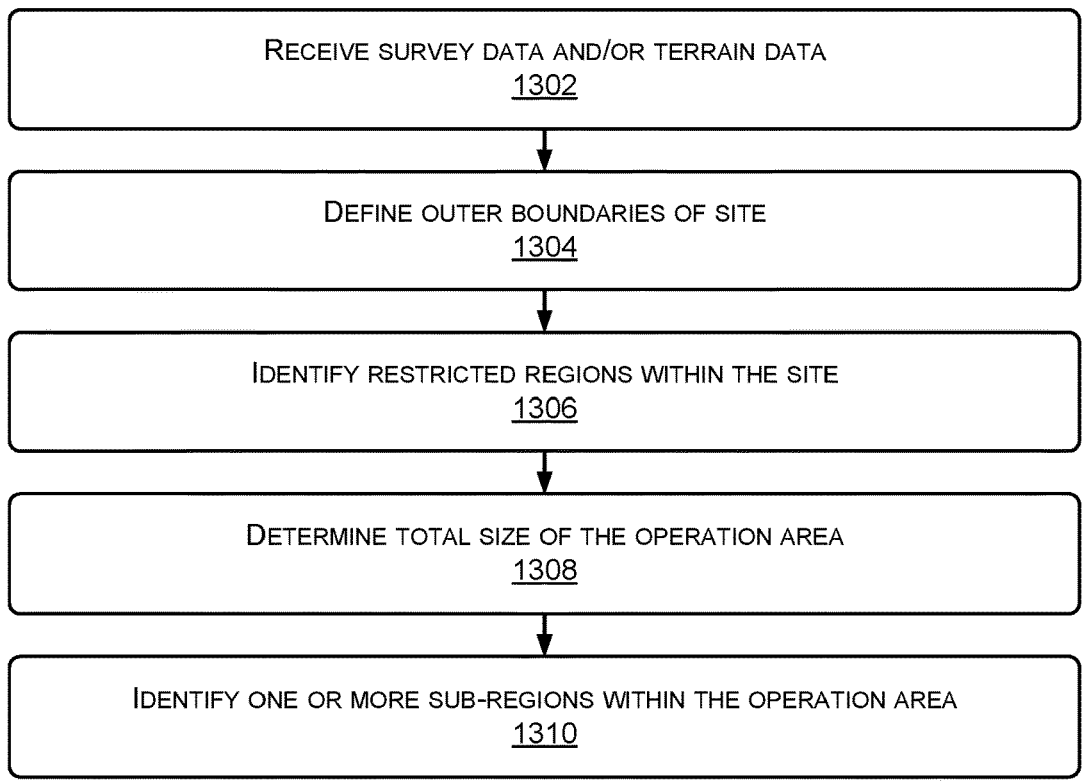
FIG. 13 is an example flow diagram showing an illustrative process for segmenting a site into sub-regions according to some implementations.

FIG. 13 is an example flow diagram showing an illustrative process 1300 for segmenting a site into sub-regions according to some implementations. For example, as shown above in FIG. 2, some sites may be large enough to safely accommodate multiple vehicles operating substantially simultaneously on different tasks in different areas of the site.

At 1302, the administrator system receives the survey data and/or terrain data. For example, the administrator system may receive the survey data as described above with respect to FIG. 12 or terrain data collected by the vehicles during operation.

At 1304, the administrator system may define outer boundaries of the site based at least in part on the survey and/or terrain data.

At 1306, the administrator system may identify restricted regions within the site. For instance, an operator may input the restricted areas such as parking lots, temporary buildings, human accessible regions, etc. on the site. In other instances, the administrator system may analyze the survey and/or terrain data to identify restricted areas such as steep inclines or declines that are not navigable by the vehicles, standing water (e.g., lakes, ponds, rivers, among others), larger rock outcroppings, etc.

At 1308, the administrator system may determine the total size of the operation area or the area associated with the autonomous vehicles. For example, the size of the operation area may be based on the size of the site minus the restricted areas.

At 1310, the administrator system identifies one or more sub-regions within the operation area. For example, the administrator system may determine the number of sub-regions based at least in part on a type, size, and work area associated with each vehicle, the type of operations being performed, and the size and shape of the operation area. In some cases, the administrator system may assign only a single sub-region to the entire site, such as when the site is only a few acres in total.

Figure 14:
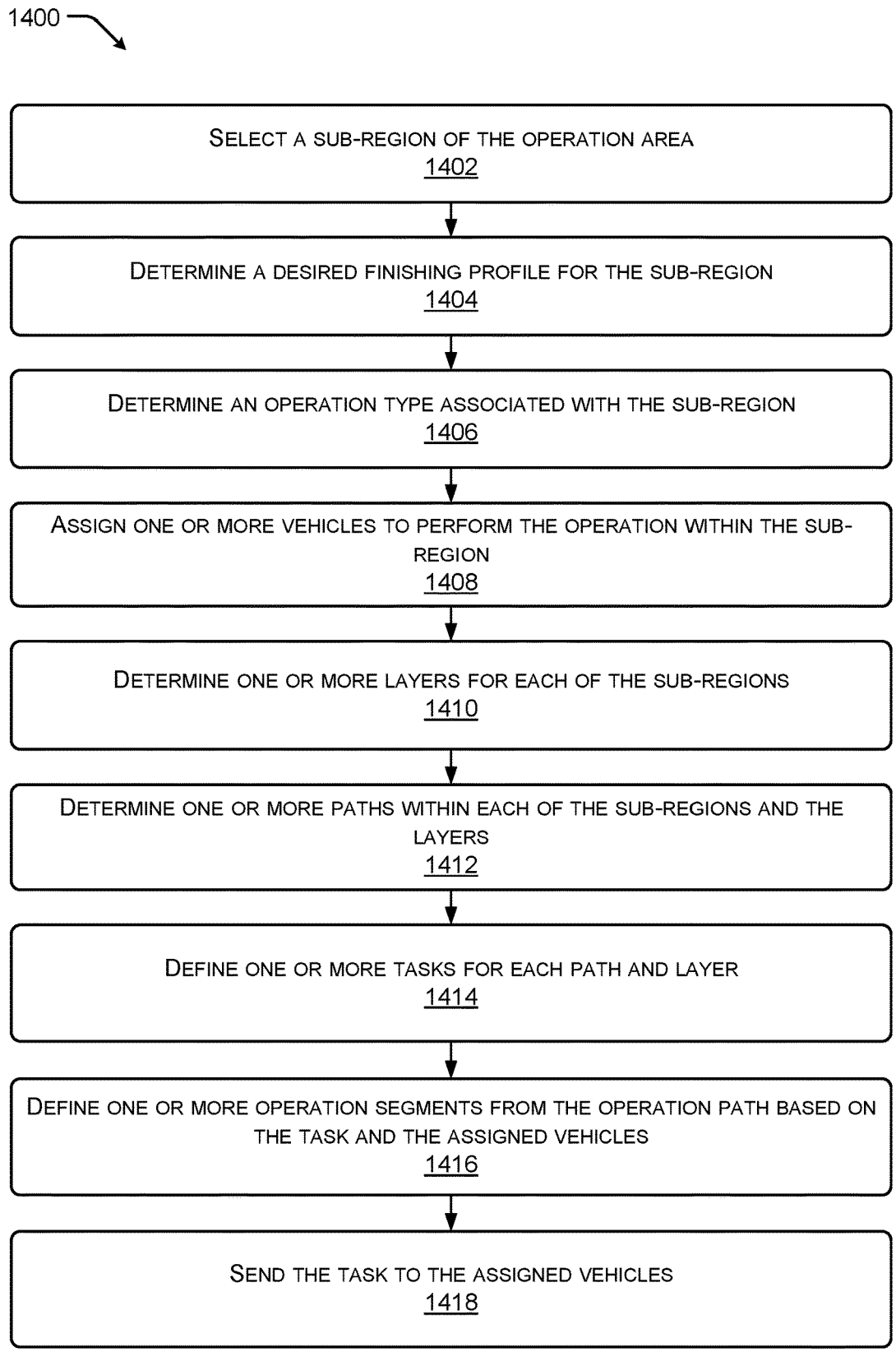
FIG. 14 is an example flow diagram showing an illustrative process for generating tasks of a mission associated with a sub-region according to some implementations.

FIG. 14 is an example flow diagram showing an illustrative process 1400 for generating tasks of a mission associated with a sub-region according to some implementations. For example, as described above with respect to FIG. 3, the mission may be organized as a tree structure with the segments acting as leaf nodes. In this manner, the vehicles may perform operations associated with tasks in an orderly fashion by selecting the tasks associated with consecutive or adjacent leaf nodes.

At 1402, the administrator system selects a sub-region of the operation area. For example, if the operation area of a site was divided into the five sub-regions, as illustrated in FIG. 2, the administrator system may select each of the five sub-regions individually when defining tasks to be performed and vehicles to be assigned.

At 1404, the administrator system determines a desired finishing profile for the selected sub-region. For example, the administrator system may select a level and/or grade associated with the sub-region, such as when a building may be erected on top of the sub-region.

At 1406, the administrator system may determine an operation type associated with the sub-region. For example, the operation type may include leveling, grading, removing material, raising or lowering the terrain, constructing a ramp, laying a foundation for a road, diverting a waterway, etc. In some cases, the operation type may be selected by a user while in other cases the administrator system may select the operation type based on the desired finishing profile.

At 1408, the administrator system may assign one or more vehicles to perform operations on the sub-region. For example, the administrator system may select the vehicles based on the operation type selected (e.g., a bulldozer or grader for leveling, an excavator and rock truck for removing material, etc.).

At 1410, the administrator system may determine one or more layers for each of the sub-regions. In some case, the layers may be a vertical division of the sub-region, such that tasks may be performed on each layer in sequence. For example, as described above with respect to FIGS. 4-6, a layer of material may be removed from a sub-region in order to maintain an even height across the sub-region thereby removing risks, such as falling, to humans and the vehicles associated with uneven terrain.

At 1412, the administrator system determines one or more paths within each of the sub-regions and the layers. As discussed above, each path is a horizontal division of the sub-region and associated with multiple layers.

At 1414, the administrator system may define one or more tasks for each path and each layer. For example, the width of a path may be based on the implement of the vehicle assigned and the depth of a layer maybe based on a load capability of the vehicle. Thus, a vehicle may be configured to perform tasks associated with a path and a layer on each pass over the sub-region.

At 1416, the administrator system may define one or more segments for each path. For example, if a load on the vehicle selected exceeds a threshold amount given the length of the path and the depth of the layer, the administrator system may divide the path into segments to be performed as individual tasks or passes along the path by the vehicle, as the material associated with each layer is removed.

At 1418, the administrator system may send the tasks to the assigned vehicles. For example, the administrator system may assign a task to a vehicle and wait until a complete signal is received before assigning the next task within the sub-region to either the same or a different vehicle. In other cases, the administrator system may send the mission or the mission to each vehicle assigned, such that the vehicles may perform their assigned tasks in coordination with each other and in the correct order without having to receive each task individually from the administrator system.

Figure 15:
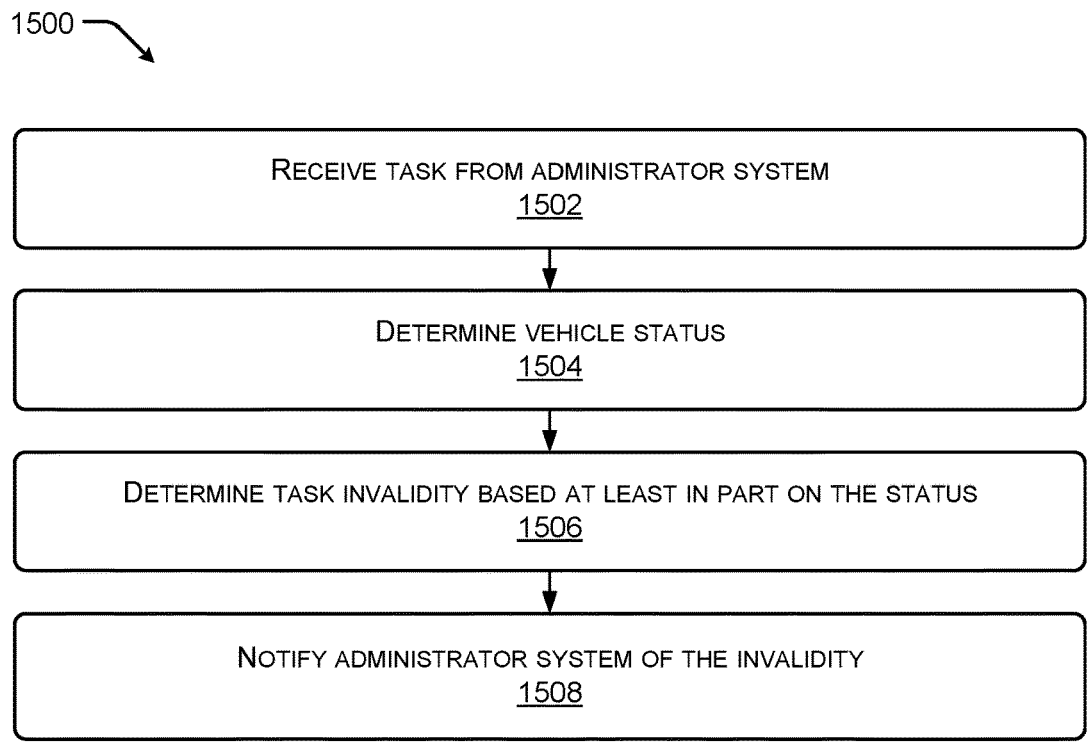
FIG. 15 is an example flow diagram showing an illustrative process performed by a vehicle to confirm validity of a task according to some implementations.

FIG. 15 is an example flow diagram showing an illustrative process 1500 performed by a vehicle to confirm validity of a task according to some implementations. For example, the vehicle may receive one or more tasks to perform as part of a mission from an administrator system. In some cases, the vehicle may be damaged or otherwise unable to perform one or all of the assigned tasks and, therefore, may validate each of the assigned tasks prior to performing operations associated with each.

At 1502, the vehicle may receive a task from the administrator system. As discussed above, the task may include operations to be performed within a sub-region, layer, path, and/or segment of a site.

At 1504, the vehicle may determine a vehicle status. For example, the vehicle may perform a health or status check on the vehicle systems to determine that each is operating within the expected or desired ranges. In one specific example, the administrator system may provide instructions related to a diagnostic test that the vehicle may perform to check the health of the vehicle and the status and accuracy of the navigation controls. For example, the health of the vehicle may include the power range (e.g., the minimum and maximum rotation per minute associated with an engine drive shaft), the coolant temperature, oil pressure, battery voltage, wheel or rack slip rate, etc. In some cases, the vehicle may be determined to be healthy when the various parameters are within one or more thresholds or ranges (e.g., the coolant temperature is between a maximum and minimum acceptable temperature).

In some cases, the vehicle may perform one or more operations or maneuvers while a control unit or other sensors track and report the operational functionality of the vehicle. For instance, the vehicle may determine from the test operations that the vehicle's minimum turn radius is larger than expected given the make and model of the vehicle. In some cases, the vehicle may determine attributes of the terrain while preforming the maneuvers which may be reported back to the administrator system for use in adjusting the mission. For example, the control unit may determine a hardness of the terrain by monitoring slip rate of the wheel and/or track, engine output power, and the implement load.

At 1506, the vehicle may determine a task invalidity based on the status or results of the health diagnostic. For instance, the vehicle may determine that a maximum cut angle is exceeded during the operations associated with the task. In another instance, the vehicle may determine that the duration of the task exceeds the time required to perform the operations under the power restraints, velocity restraints, vehicle wear and tear restraints, or other restraints.

At 1508, the vehicle notifies the administrator system to the invalidity of the task. In this manner, the administrator system may select another vehicle to perform the operations associated with the task or alter the mission to accommodate for the inaccuracies in the task definitions. For example, if the administrator system did not allot sufficient time to complete the operations associated with the task, the administrator system may extend the timeline associated with the mission to allow for sufficient time on each task being performed by the vehicle.

Figure 16:
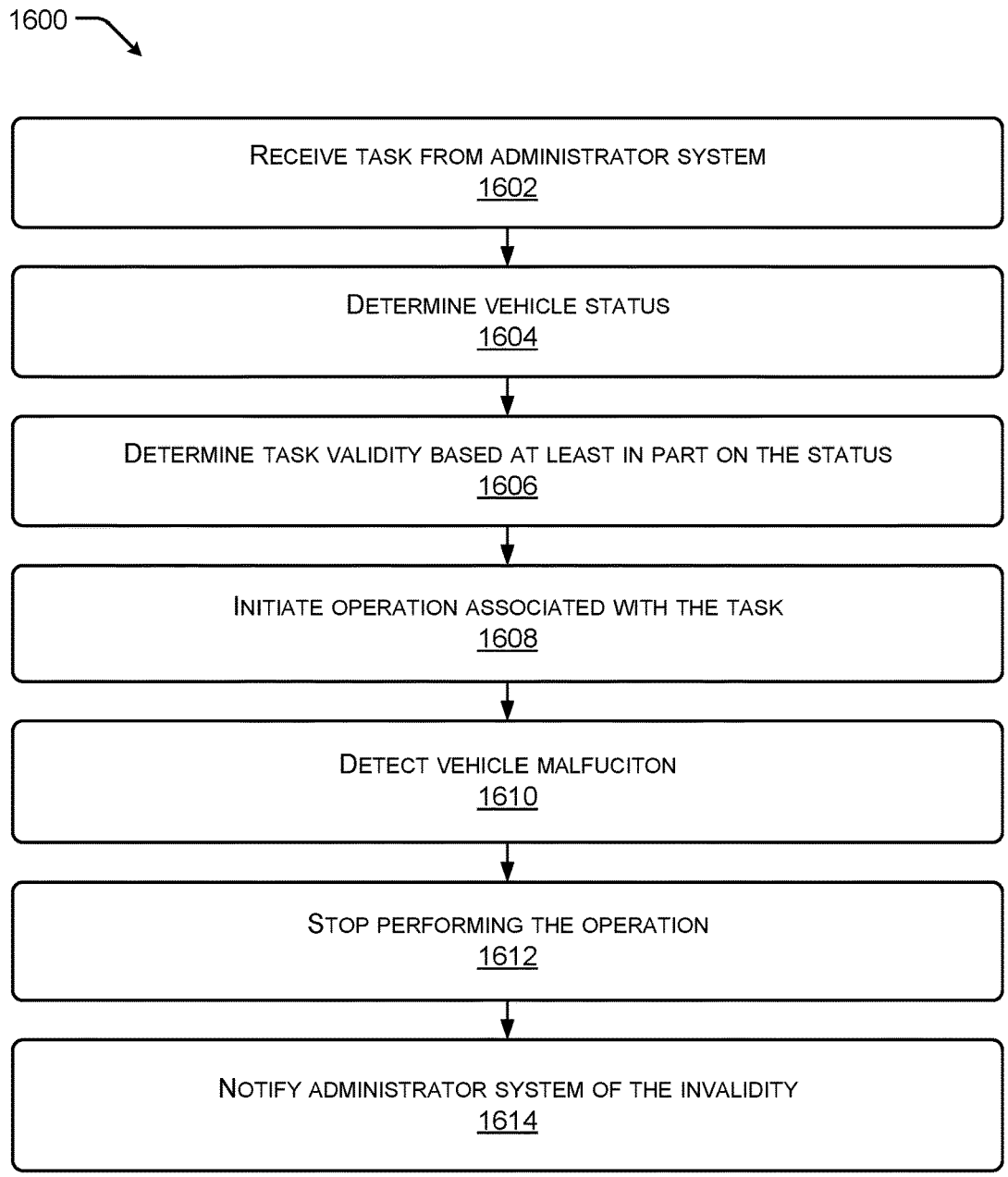
FIG. 16 is an example flow diagram showing an illustrative process performed by a vehicle in the case of a malfunction according to some implementations.

FIG. 16 is an example flow diagram showing an illustrative process 1600 performed by a vehicle in the case of a malfunction according to some implementations. For example, the vehicle may receive one or more tasks to perform as part of a mission from an administrator system. In some cases, during operation, the vehicle may be damaged or otherwise unable to perform one or all of the assigned tasks and, therefore, may be unable to compete the operation associated with one or more assigned tasks.

At 1602, the vehicle may receive a task form the administrator system. As discussed above, the task may include operations to be performed within a sub-region, layer, path, and/or segment of a site.

At 1604, the vehicle may determine a vehicle status. For example, the vehicle may perform a health or status check on the vehicle systems to determine each is operating within the expected or desired ranges. In one specific example, the administrator system may provide instructions related to a diagnostic test that the vehicle may perform to check the health of the vehicle and the status and accuracy of the navigation controls. For example, the health of the vehicle may include the power range (e.g., the minimum and maximum rotation per minute associated with an engine drive shaft), the coolant temperature, oil pressure, battery voltage, wheel or rack slip rate, etc. In some cases, the vehicle may be determined to be healthy when the various parameters are within one or more thresholds or ranges (e.g., the coolant temperature is between a maximum and minimum acceptable temperature).

In some cases, the vehicle may perform one or more operations or maneuvers while a control unit or other sensors track and report the operational functionality of the vehicle. For instance, the vehicle may determine from the test operations that the vehicle's minimum turn radius is larger than expected given the make and model of the vehicle. In some cases, the vehicle may determine attributes of the terrain while performing the maneuvers which may be reported back to the administrator system for use in adjusting the mission. For example, the control unit may determine a hardness of the terrain by monitoring slip rate of the wheel and/or track, engine output power, and the implement load.

At 1606, the vehicle may determine a task validity based on the status or results of the health diagnostic. For instance, the vehicle may determine that the vehicle is operating within desired parameters and able to perform each operation associated with the task.

At 1608, the vehicle may initiate operations associated with the task. For example, the vehicle may navigate to an appropriate starting position according to the segment or path and begin performing a task, such as leveling, grading, scrapping, lawn mowing, tree removal, etc.

At 1610, the vehicle may detect a malfunction. For example, the vehicle may determine a slip rate is greater than a predetermined threshold, thereby indicating the treads have slipped, a velocity is below an expected velocity, the turn radius has changed, engine heat is exceeding a predefined threshold, the implement is failing to adjust position, among others.

At 1612, the vehicle may stop. For example, upon detecting the malfunction the vehicle may cease performing operations and come to a stop to further evaluate the malfunction, notify the administrator system and await feedback, await an on-site operator or mechanic to evaluate the vehicle, and/or to prevent further damage. For instance, in the occurrence of engine overheating, hydraulic system over pressure issues, battery failure, mechanical errors or possible collisions detected by safety sensors, the vehicle may stop current operations and notify the administration system.

In some specific examples, rather than stopping the vehicle may determine the type of malfunction and report data associated with the malfunction to an administrator system while continue operations. In these examples, the vehicle may stop in response to instructions from the administrator system, otherwise the vehicle may complete the current task. For instance, vehicle slip and/or changes in vehicle driving velocity are typical occurrences and may not necessarily indicate a malfunction. In these instances, the vehicle may not stop performing task. Rather, the vehicle may notify the administration system. In some cases, the administrator system may provide an updated task based on the information and wait to see if the issue re-occurs.

At 1614, the vehicle may notify the administrator system to the malfunction. In some cases, the vehicle may determine if the malfunction prohibits the vehicle from completing the task and, if not, the vehicle may continue to perform operations after notifying the administrator system. In one particular example, the administrator system may determine based on information provided by the vehicle if the vehicle is capable of completing the operation associated with the task. Otherwise, the vehicle may re-initiate operations.

It should be understood, that the vehicle may also preform the process 1600 during operations. For instance, the vehicle may be configured to preform continuous or periodic system or status checks while the vehicle is preforming operations to ensure the vehicle is maintained in good working conduction during the entire working period. In this way, the vehicle identify issues prior to a major breakdowns that would put the vehicle out of commission for extended periods.

Figure 17:
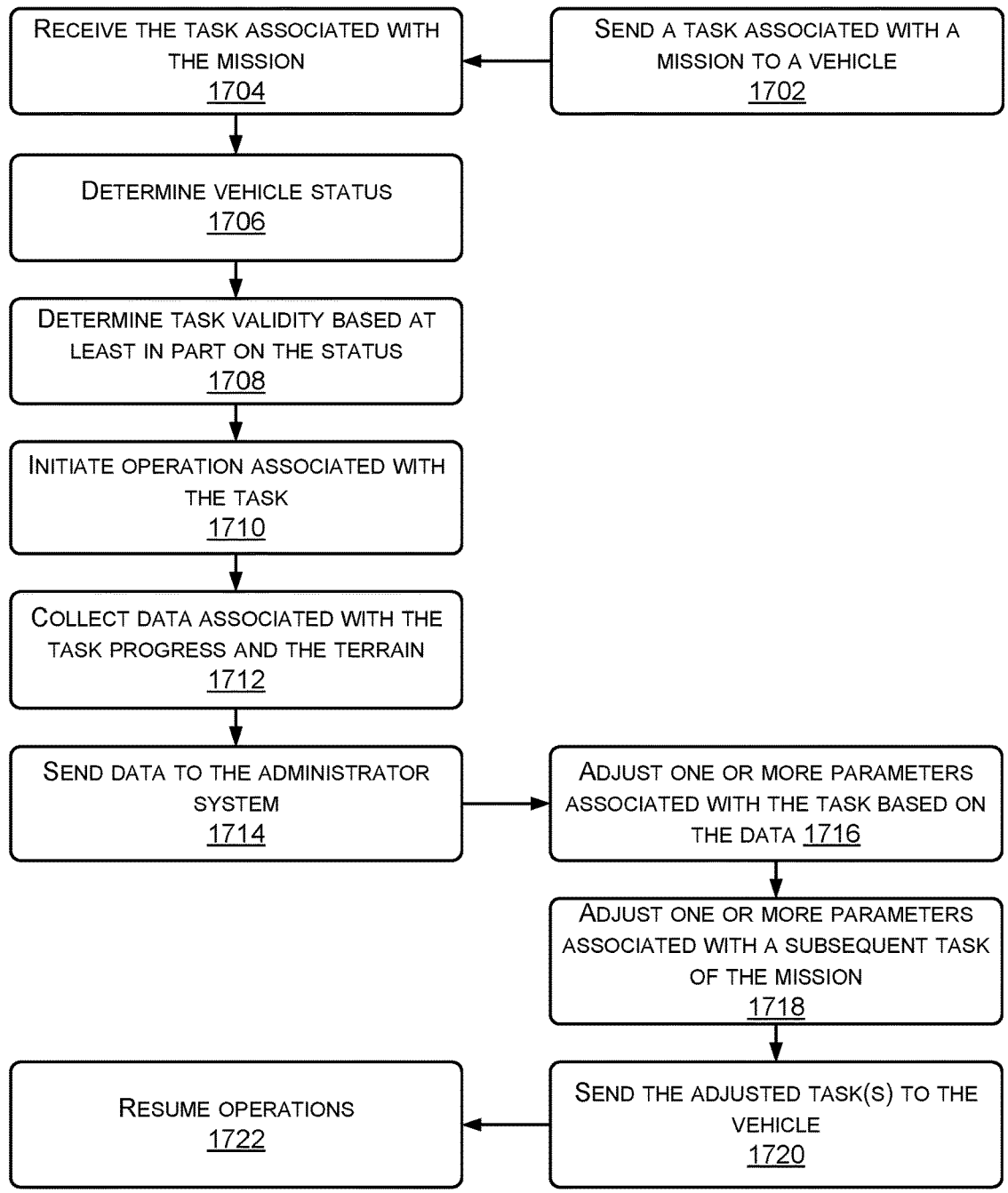
FIG. 17 is an example flow diagram showing an illustrative process for adjusting a mission based on data collected by the vehicles performing operations on the site according to some implementations.

FIG. 17 is an example flow diagram showing an illustrative process 1700 for adjusting a mission based on data collected by the vehicles performing operation on the site according to some implementations. For example, the vehicle may receive one or more tasks to perform as part of a mission from an administrator system. During operation, the vehicle may collect data associated with the progress of each task and the state of the terrain. In some cases, the progress may deviate form an expected progress or the terrain may diverge in a manner that necessitates a change to the current task and possibly subsequent tasks.

At 1702, the administrator system sends one or more tasks to one or more vehicles. In some cases, the administrator system may provide the mission to each vehicle operation on the site such that each vehicle may identify tasks assigned to each vehicle based on the mission.

At 1704, the vehicle may receive the task from the administrator system. As discussed above, the task may include operations to be performed within a sub-region, layer, path, and/or segment of a site.

At 1706, the vehicle may determine a vehicle status. For example, the vehicle may perform a health or status check on the vehicle systems to determine each is operating within the expected or desired ranges. In one specific example, the administrator system may provide instructions related to a diagnostic test that the vehicle may perform to check the health of the vehicle and the status and accuracy of the navigation controls. For example, the health of the vehicle may include the power range (e.g., the minimum and maximum rotation per minute associated with an engine drive shaft), the coolant temperature, oil pressure, battery voltage, wheel or rack slip rate, etc. In some cases, the vehicle may be determined to be healthy when the various parameters are within one or more thresholds or ranges (e.g., the coolant temperature is between a maximum and minimum acceptable temperature).

In some cases, the vehicle may perform one or more operations or maneuvers while a control unit or other sensors track and report the operational functionality of the vehicle. For instance, the vehicle may determine from the test operations that the vehicle's minimum turn radius is larger than expected given the make and model of the vehicle. In some cases, the vehicle may determine attributes of the terrain while performing the maneuvers which may be reported back to the administrator system for use in adjusting the mission plan. For example, the control unit may determine a hardness of the terrain by monitoring slip rate of the wheel and/or track, engine output power, and the implement load.

At 1708, the vehicle may determine a task validity based on the status or results of the health diagnostic. For instance, the vehicle may determine that the vehicle is operating within desired parameters and able to perform each operation associated with the task.

At 1710, the vehicle may initiate operations associated with the task. For example, the vehicle may navigate to an appropriate starting position according to the segment or path and begin performing a task, such as leveling, grading, scrapping, lawn mowing, tree removal, etc.

At 1712, the vehicle may collect data associated with the task progress and the terrain. For example, the vehicle may monitor a depth of a cut, the amount of load on the implement, detect unexpected obstacles, among others. In some cases, the vehicle may be unable to perform the task in a single pass or within the time allotted by the mission.

At 1714, the vehicle sends the data to the administrator system and, at 1716, the administrator system may adjust one or more parameters associated with the task based on the data received. For example, the administrator system may reduce the thickness of the current layer, increase the number of segments within a pass, etc.

At 1718, the administrator system may adjust one or more parameters associated with a subsequent task based on the data received. For example, if the administrator system reduced the thickness of the layer, the administrator system may add additional tasks or passes to the mission plan.

Similarly, if the thickness of the current layer was reduced, thickness of other layers may also be reduced resulting in a reduction in cut depth for each subsequent task on the current path (and possibly adjacent paths).

At 1720, the administrator system may send the adjusted mission or tasks to the vehicle. For example, the administrator system may provide each new or adjusted tasks to the vehicle assigned to perform the task. At 1722, the vehicle receives the adjusted mission or tasks and resumes operations.

Figure 18:
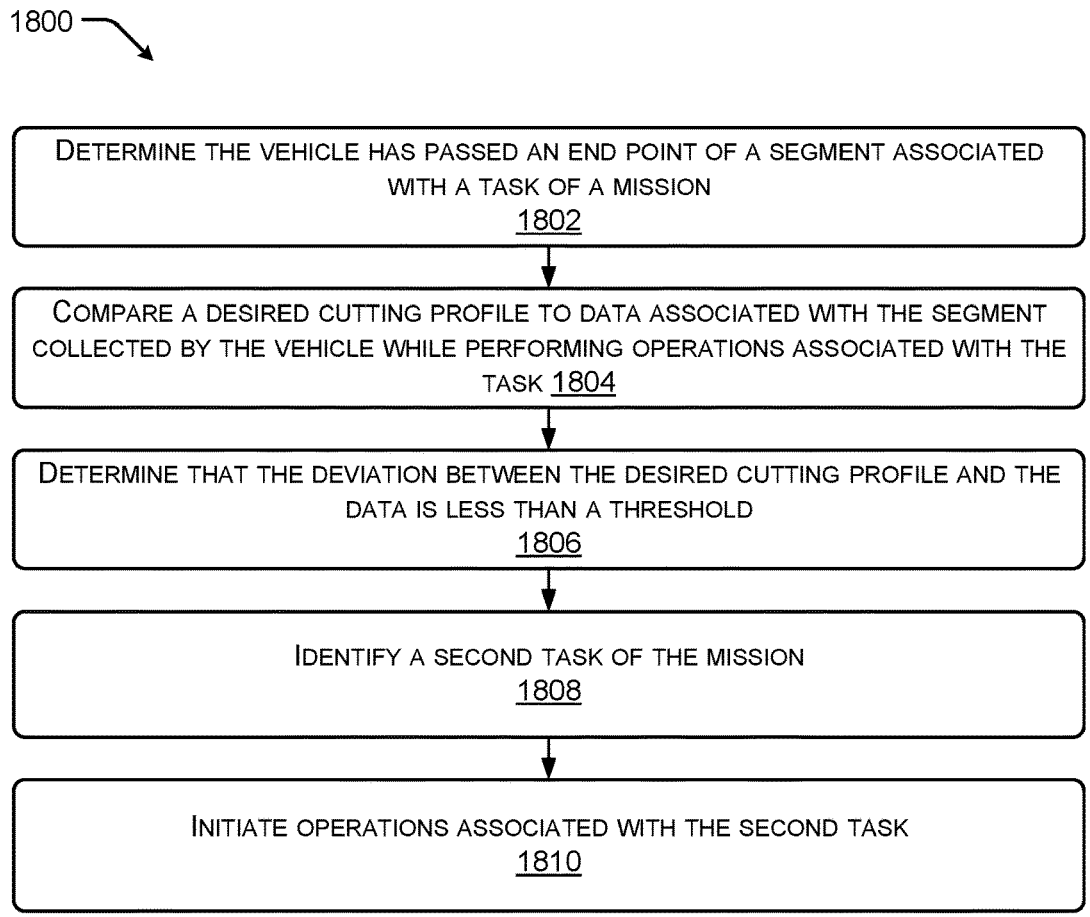
FIG. 18 is an example flow diagram showing an illustrative process for determining completion of a task by a vehicle according to some implementations.

FIG. 18 is an example flow diagram showing an illustrative process 1800 for determining completion of a task by a vehicle according to some implementations. For example, the vehicle may perform operations in order to complete a series of consecutive tasks based on a plan outlined in a mission by the administrator system. In some implementations, the vehicle may be configured to determine if the task associated with a current segment (or path) and layer is complete.

At 1802, the vehicle may determine that the vehicle has passed an end point of a segment associated with a task. For example, the vehicle may include a position system that collects data that is usable to determine the location of a particular point on the vehicle and/or on the implement. In some cases, the vehicle may determine that the current location is along an end point of the current segment (or path) by comparing the location with the data associated with the segment or mission.

At 1804, the vehicle may compare a desired cutting profile indicated in the mission to data associated with the segment collected by the vehicle while performing operations associated with the task. For example, the vehicle may include various sensors, such as gyroscopes, accelerometers, magnetometers, other internal measurement units, image components, laser scanners, among others that may be used to determine the grade, slope, and depth of the segment as the vehicle performs operations.

At 1806 the vehicle may determine that the deviation between the desired cutting profile and the data collected is less than a threshold. For example, the threshold may include multiple thresholds, such as depth thresholds, slope or grade thresholds, levelness thresholds, etc. For instance, if the site is being prepared for a building, a deviation of more than a few millimeters from level may cause major structural issues for the building itself. In one particular example, the thresholds may include an error threshold (e.g., a maximum error threshold for an end result of the finishing profile and/or for each system being monitored) and/or an accumulated error threshold (e.g., for each task or path and/or for the overall system operations). For instance, the slope or grade thresholds may have a maximum allowable slope discrepancy (such as two degrees) for the finished profile. In some situations, such as highway construction even the two percent error in slope may create dangerous driving conditions, as such the error maximum error thresholds may be small depending on the project type. A second slope or grade thresholds may be utilized as an accumulated slope errors along each task performed on the path. For example, all the added slope errors (absolute values) should be no more than 10 degrees. (The overall results are acceptable)

At 1808, the vehicle may identify a second task of the mission. For instance, the vehicle may select tasks associated with the next layer or segment along the same path or a task from an adjacent or next path within the same layer. In some cases, the vehicle may notify the administrator system to the completion and the administrator system may provide the next task. In other cases, the next task within the sub-region may be assigned to a second vehicle and the first vehicle or the administrator system may signal the second vehicle as to the completed status of the first task assigned to the first vehicle.

At 1810, the vehicle (or the second vehicle) may initiate operations associated with the second task. For example, the vehicle may navigate to a start point of the next segment and proceed to perform an operation, such as removing material. In the current example, the vehicle may determine the completion of the task by comparing the data collected to the desired cutting profile. However, in other cases, the processing may be performed by the administrator system or other system in communication with the vehicle.

Figure 19:
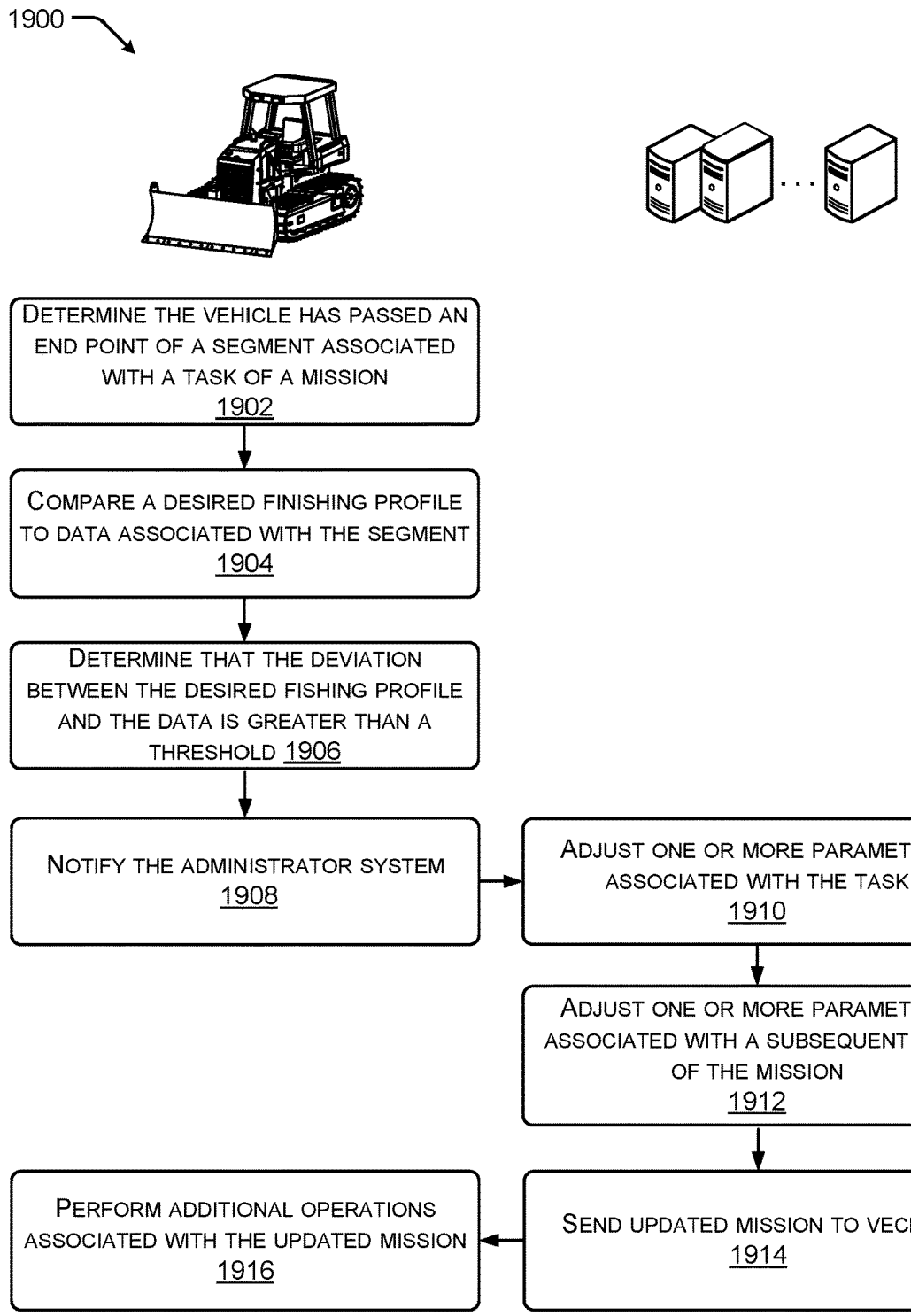
FIG. 19 is another example flow diagram showing an illustrative process for determining completion of a task by a vehicle according to some implementations.

FIG. 19 is an example flow diagram showing an illustrative process 1900 for determining completion of a task by a vehicle according to some implementations. For example, the vehicle may perform operations in order to complete a series of consecutive tasks based on a plan outlined in a mission by the administrator system. In some implementations, the vehicle may be configured to determine if the task associated with a current segment (or path) and layer is complete or if one or more of the parameters associated with the task of the segment should be adjusted.

At 1902, the vehicle may determine that the vehicle has passed an end point of a segment associated with a task. For example, the vehicle may include a position system that collects data that is usable to determine the location of a particular point on the vehicle and/or on the implement. In some cases, the vehicle may determine that the current location is along an end point of the current segment (or path) by comparing the location with the data associated with the segment or mission.

At 1904, the vehicle may compare a desired cutting profile indicated in the mission to data associated with the segment collected by the vehicle while performing operations associated with the task. For example, the vehicle may include various sensors, such as gyroscopes, accelerometers, magnetometers, other internal measurement units, image components, laser scanners, among others that may be used to determine the grade, slope, and depth of the segment as the vehicle performs operations.

At 1906 the vehicle may determine that the deviation between the desired cutting profile and the data collected is greater than a threshold. For example, the threshold may include multiple thresholds, such as depth thresholds, slope or grade thresholds, levelness thresholds, etc. For instance, if the site is being prepared for a building, a deviation of more than a few millimeters from level may cause major structural issues for the building itself.

At 1908, the vehicle may notify the administrator system that the task is incomplete. For example, the vehicle may send the data collected, the results of the comparison, suggestions related to updating the task, among others to the administrator system.

At 1910, the administrator system may adjust one or more parameters associated with the task based on the data received. For example, the administrator system may reduce the thickness of the current layer, increase the number of segments within a pass, etc. in some cases, the administrator system may change the vehicle assigned to the task, e.g., a different type of vehicle is now assigned (e.g., a grader in lieu of a bulldozer), a larger vehicle is assigned or a vehicle with a larger implement.

At 1912, the administrator system may adjust one or more parameters associated with a subsequent task based on the data received. For example, if the administrator system reduced the thickness of the layer, the administrator system may add additional tasks or passes to the mission plan. Similarly, if the thickness of the current layer was reduced, thickness of other layers may also be reduced resulting in a reduction in cut depth for each subsequent task on the current path (and possibly adjacent paths).

At 1914, the administrator system may send the updated mission (or tasks) to the vehicle. For example, the administrator system may provide each new or adjusted task to the vehicle assigned to perform the task. At 1916, the vehicle receives the adjusted mission or tasks and performs additional operations associated with the updated mission.

Figure 20:
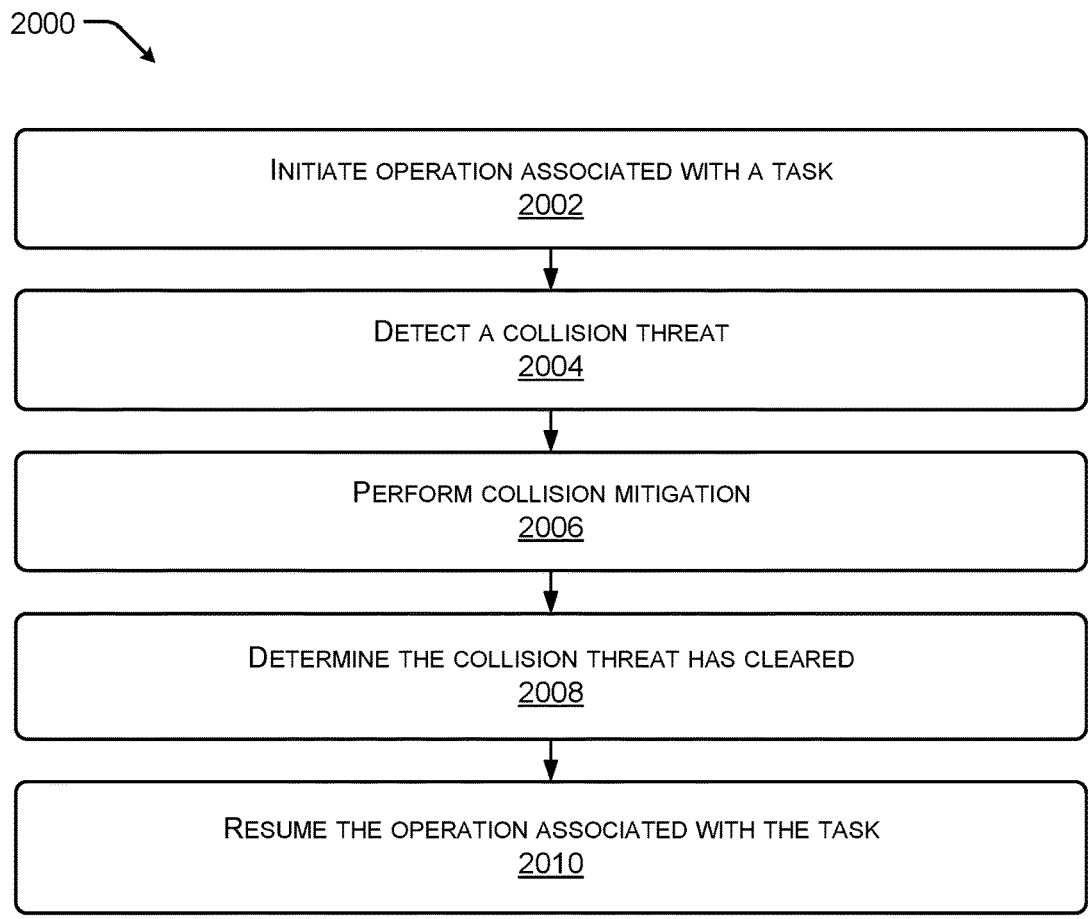
FIG. 20 is an example flow diagram showing an illustrative process performed by the vehicle in response to detecting a collision threat according to some implementations.

FIG. 20 is an example flow diagram showing an illustrative process 2000 performed by the vehicle in response to detecting a collision threat according to some implementations. For instance, as described above with respect to FIGS. 7-11, the vehicle may include a detection zone, an alert zone, and a brake zone for detecting the presence of an unknown object and avoiding collisions.

At 2002, the vehicle may initiate operations associate with a task. For example, the vehicle may navigate to a segment and engage an implement to remove material or lower the terrain.

At 2004, the vehicle may detect a collision threat. For example, the vehicle may identify an object within one of the detections zones (e.g., front, left, right, and rear). For example, if the vehicle is moving in a forward direction the vehicle may detect a possible collision threat in front of the vehicle based on the vehicle's current trajectory and velocity and/or the trajectory and velocity of the object.

At 2006, the vehicle may perform collision mitigation. For instance, the vehicle may apply a brake to reduce velocity or come to a stop. The vehicle may also broadcast a warning message, flash lights, sound a horn, notify a remote operator, etc.

At 2008, the vehicle may determine the collision threat has cleared. For example, by reducing the velocity of the vehicle, the vehicle may determine that the threat of collision was reduced and the object will have moved past the vehicle prior to the vehicle intersecting the path of the object. In another example, the vehicle may have stopped and the object may be a wild animal. By sounding the horn and flashing the lights, the vehicle may cause the animal to change directions and leave the vicinity of the vehicle.

At 2010, the vehicle may resume the operation associated with the task. For example, the vehicle may re-accelerate or return to the desired operating velocity. In the current example, the collision threat cleared, however, in some situations, the object may be a fixed object such as a large rock that was dislodged during operations on an adjacent path.

Figure 21:
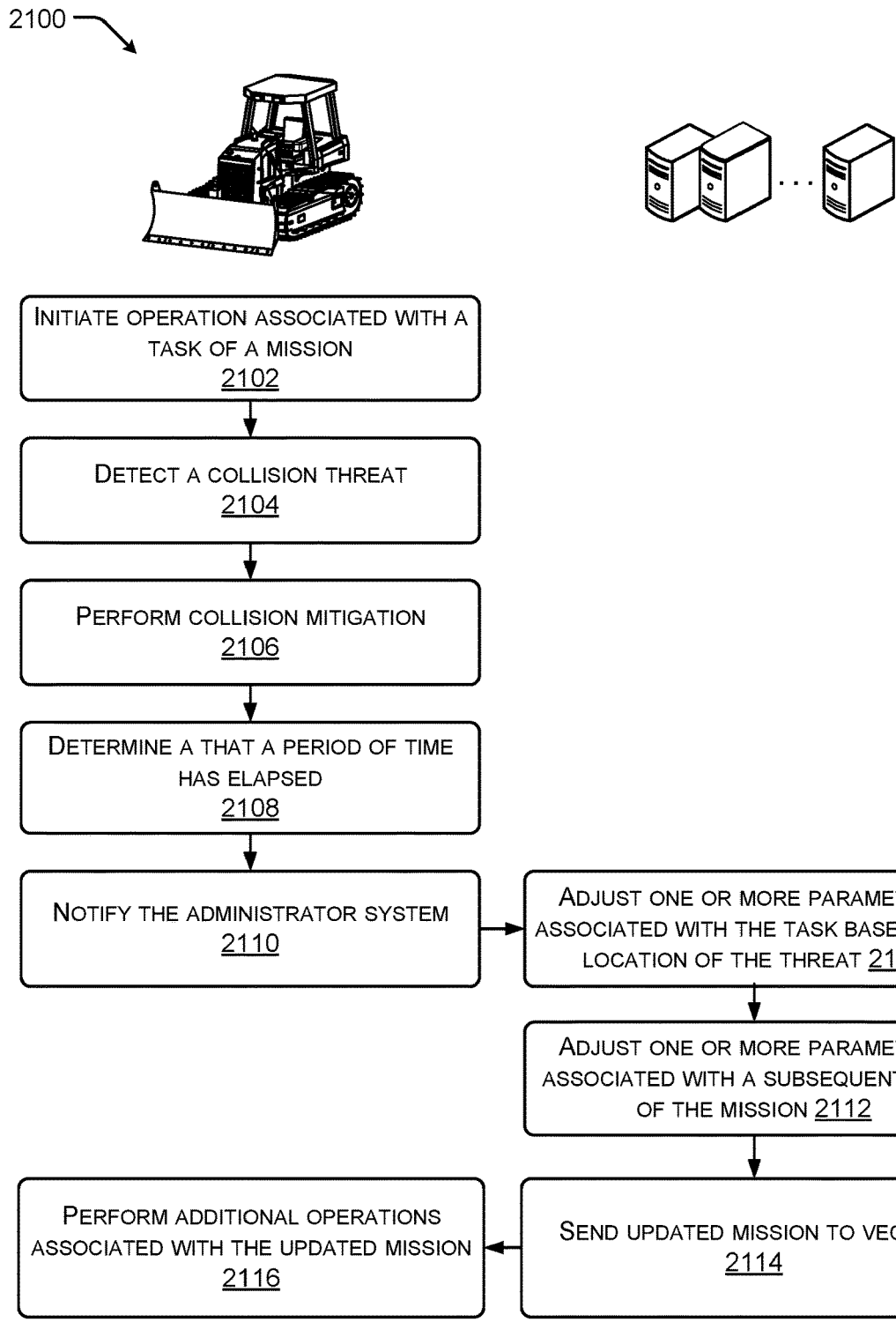
FIG. 21 is an example flow diagram showing an illustrative process performed by the vehicle in response to detecting a collision threat according to some implementations.

FIG. 21 is an example flow diagram showing an illustrative process 2100 performed by the vehicle in response to detecting a collision threat according to some implementations. For instance, as described above with respect to FIGS. 7-11, the vehicle may include a detection zone, an alert zone, and a brake zone for detecting the presence of an unknown object and avoiding collisions.

At 2102, the vehicle may initiate operations associated with a task. For example, the vehicle may navigate to a segment and engage an implement to remove material or lower the terrain.

At 2104, the vehicle may detect a collision threat. For example, the vehicle may identify an object within one of the detections zones (e.g., front, left, right, and rear). For example, if the vehicle is moving in a forward direction the vehicle may detect a possible collision threat in front of the vehicle based on the vehicle's current trajectory and velocity and/or the trajectory and velocity of the object.

At 2106, the vehicle may perform collision mitigation. For instance, the vehicle may apply a brake to reduce velocity or come to a stop. The vehicle may also broadcast a warning message, flash lights, sound a horn, notify a remote operator, etc.

At 2108, the vehicle may determine that a period of time has elapsed. For instance, the vehicle may have come to a stop as the object may have been in front of the vehicle (or within the path) and stationary (such as a case when a large rock that was dislodged during operations on an adjacent path).

At 2110, the vehicle may notify the administrator system to the fact that the object remains a collision threat following the expiration of the predefined wait period. At 2112, the administrator system may adjust one or more parameters associated with the task based on the position and size of the object. For example, the administrator system may alter the path to avoid the object.

At 2112, the administrator system may adjust one or more parameters associated with a subsequent task based on the data received. For example, if the administrator system altered the path, the administrator system may alter adjacent paths to accommodate the changes to the current path.

At 2114, the administrator system may send the updated mission (or tasks) to the vehicle. For example, the administrator system may provide each new or adjusted tasks to the vehicle assigned to perform the task. At 2116, the vehicle receives the adjusted mission or tasks and performs additional operations associated with the updated mission.

Figure 22:
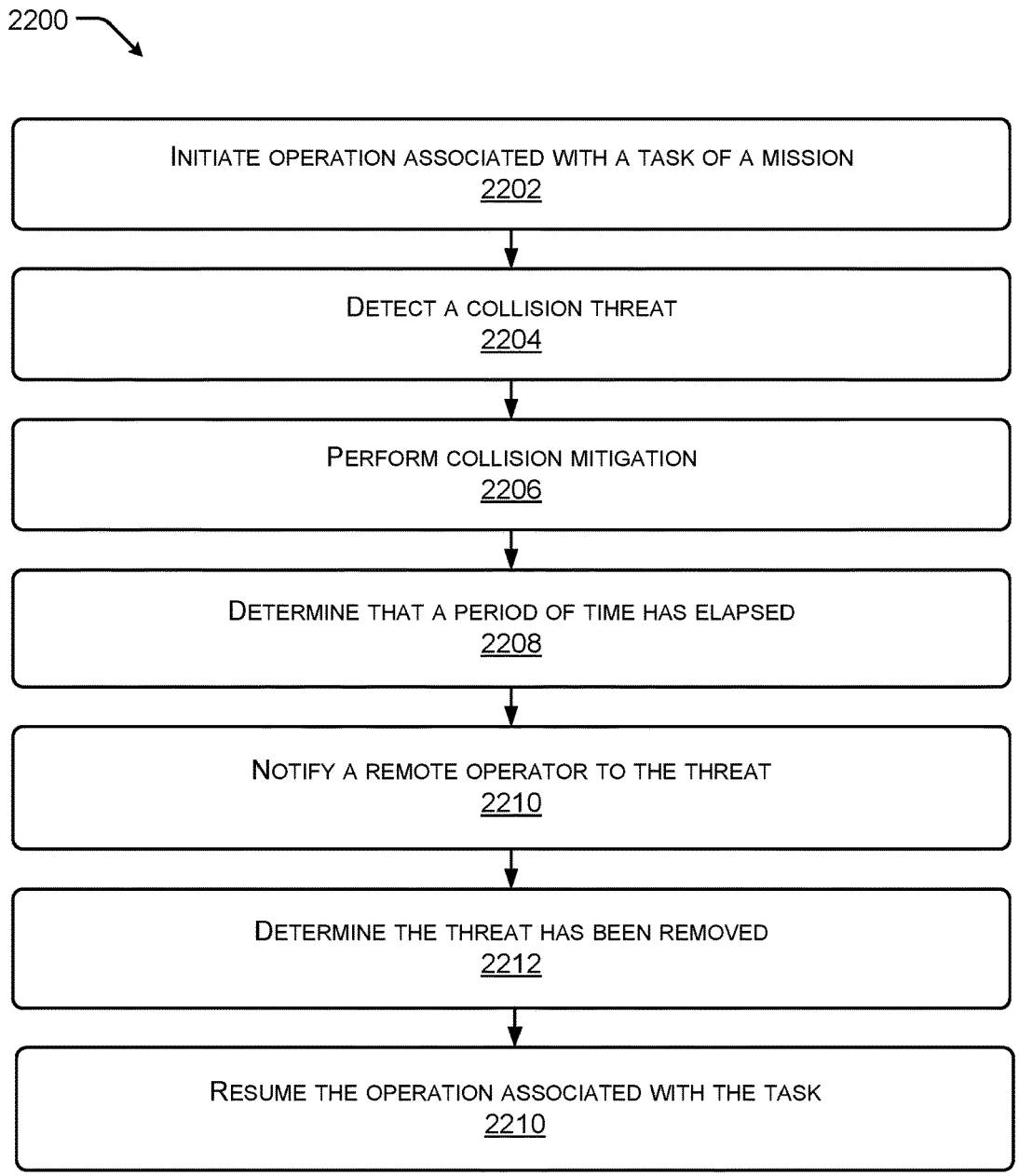
FIG. 22 is an example flow diagram showing an illustrative process performed by the vehicle in response to detecting a collision threat according to some implementations.

FIG. 22 is an example flow diagram showing an illustrative process 2200 performed by the vehicle in response to detecting a collision threat according to some implementations. For instance, as described above with respect to FIGS. 7-11, the vehicle may include a detection zone, an alert zone, and a brake zone for detecting the presence of an unknown object and avoiding collisions.

At 2202, the vehicle may initiate operations associated with a task. For example, the vehicle may navigate to a segment and engage an implement to remove material or lower the terrain.

At 2204, the vehicle may detect a collision threat. For example, the vehicle may identify an object within one of the detections zones (e.g., front, left, right, and rear). For example, if the vehicle is moving in a forward direction the vehicle may detect a possible collision threat in front of the vehicle based on the vehicle's current trajectory and velocity and/or the trajectory and velocity of the object.

At 2206, the vehicle may perform collision mitigation. For instance, the vehicle may apply a brake to reduce velocity or come to a stop. The vehicle may also broadcast a warning message, flash lights, sound a horn, notify a remote operator, etc.

At 2208, the vehicle may determine that a period of time has elapsed. For instance, the vehicle may have come to a stop as the object may have been in front of the vehicle (or within the path) and stationary (such as a case when a large rock that was dislodged during operations on an adjacent path).

At 2210, the vehicle may notify a remote operator related to the collision threat. For example, the vehicle may cause an indictor to be displayed on an electronic device associated with the remote operator. In other case, the vehicle may provide a video feed to the electronic device to allow the operator to view the current situation and evaluate what response is appropriate. In some cases, the operator may initiate manual control of the vehicle to remove the object, cause a second vehicle to remove the object, or manually modify the path to avoid the object.

At 2212, the vehicle may determine the collision threat has cleared. For example, the vehicle may receive instructions from the remote operator that the object has been cleared or the vehicle may detect the removal of the object by a second vehicle. At 2214, the vehicle may resume the operation associated with the task. For example, the vehicle may re-accelerate or return to the desired operating velocity.

Figure 23:
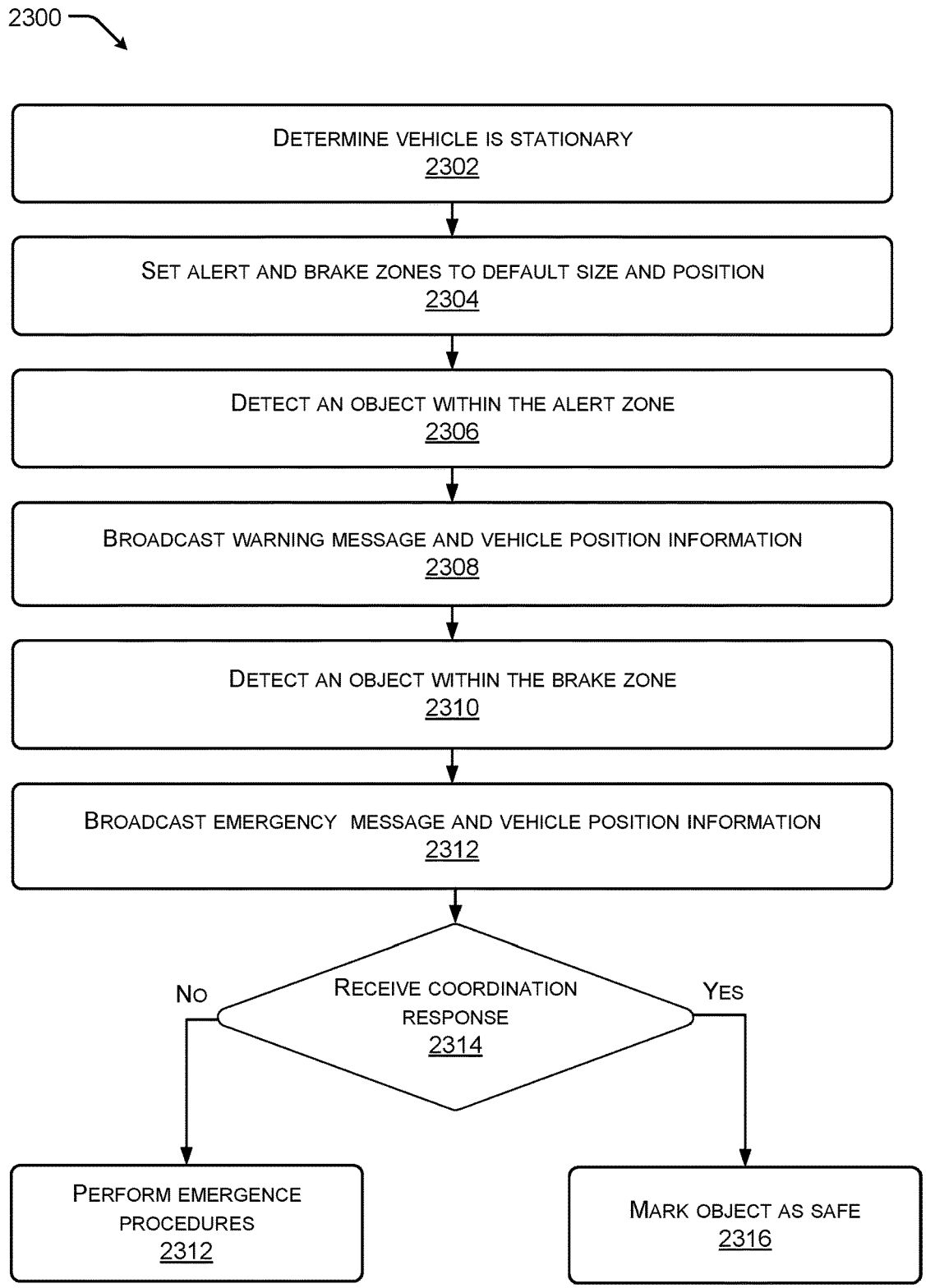
FIG. 23 is an example flow diagram showing an illustrative process for performing coordinated operations with a second vehicle according to some implementations.

FIG. 23 is an example flow diagram showing an illustrative process 2300 for performing coordinated operations with a second vehicle according to some implementations. For instance, in some situations, multiple vehicles may work in coordination to complete a task. For example, a rock truck may be filled by an excavator to remove material from a sub-region, two bulldozers may be coupled together to provide additional power to remove difficult objects from a sub-region, or a ripper may be followed by a bulldozer to first loosen then remove material from a sub-region.

At 2302, the vehicle may determine that the vehicle is stationary. For example, an excavator may be stationary for an extended period of time, as the excavator digs a hole or trench.

At 2304, the vehicle may set alert and brake zones to a default size and position. For example, as shown in FIG. 7, the alert and brake zones may be equalized to the front and rear as well as the left and right of the vehicle, as a collision is as likely from each position when the vehicle is stationary.

At 2306, the vehicle may detect an object within the alert zone. For example, a rock truck may be approaching the excavator to receive material being removed from the sub-region. Even though the rock truck is intended to enter the detection zone and alert zone of the vehicle, the vehicle may detect the rock truck as an object and proceed with collision prevention measures, such as those discussed above.

At 2308, the vehicle may broadcast a warning message and vehicle position information. For example, the vehicles may communicate via a specified communication channel. The vehicle (e.g., the excavator) may, upon detecting the object (e.g., the rock truck) in the alert zone, transmit the warning message and vehicle position over the specified communication channel.

At 2310, the vehicle (e.g., the excavator) may detect the object (e.g., the rock truck) within the brake zone. Again the rock truck may be entering the brake zone intentionally so that the excavator can load the open-bed with material. However, as discussed above, the excavator may be unaware that the object detected is the rock truck, if the rock truck failed to respond.

At 2312, the vehicle may broadcast an emergency message and vehicle position information. For example, the vehicle (e.g., the excavator) may, upon detecting the object (e.g., the rock truck) in the brake zone, transmit the emergency message and vehicle position over the specified communication channel. In some cases, the emergency message may be sent to the administrator system as well as to an electronic device associated with a remote operator or other site operator.

At 2314, the vehicle (e.g., the excavator) determines if a coordination response is received from the object (e.g., the rock truck). If a coordination response is received, the process 2300 proceeds to 2316, and the vehicle determines the object is safe. Otherwise, the process 2300 advances to 2318, and the vehicle performs emergency procedures, such as flashing lights, notifying the administrator system, notifying the remote operator, sounding a horn, etc.

Figure 24:
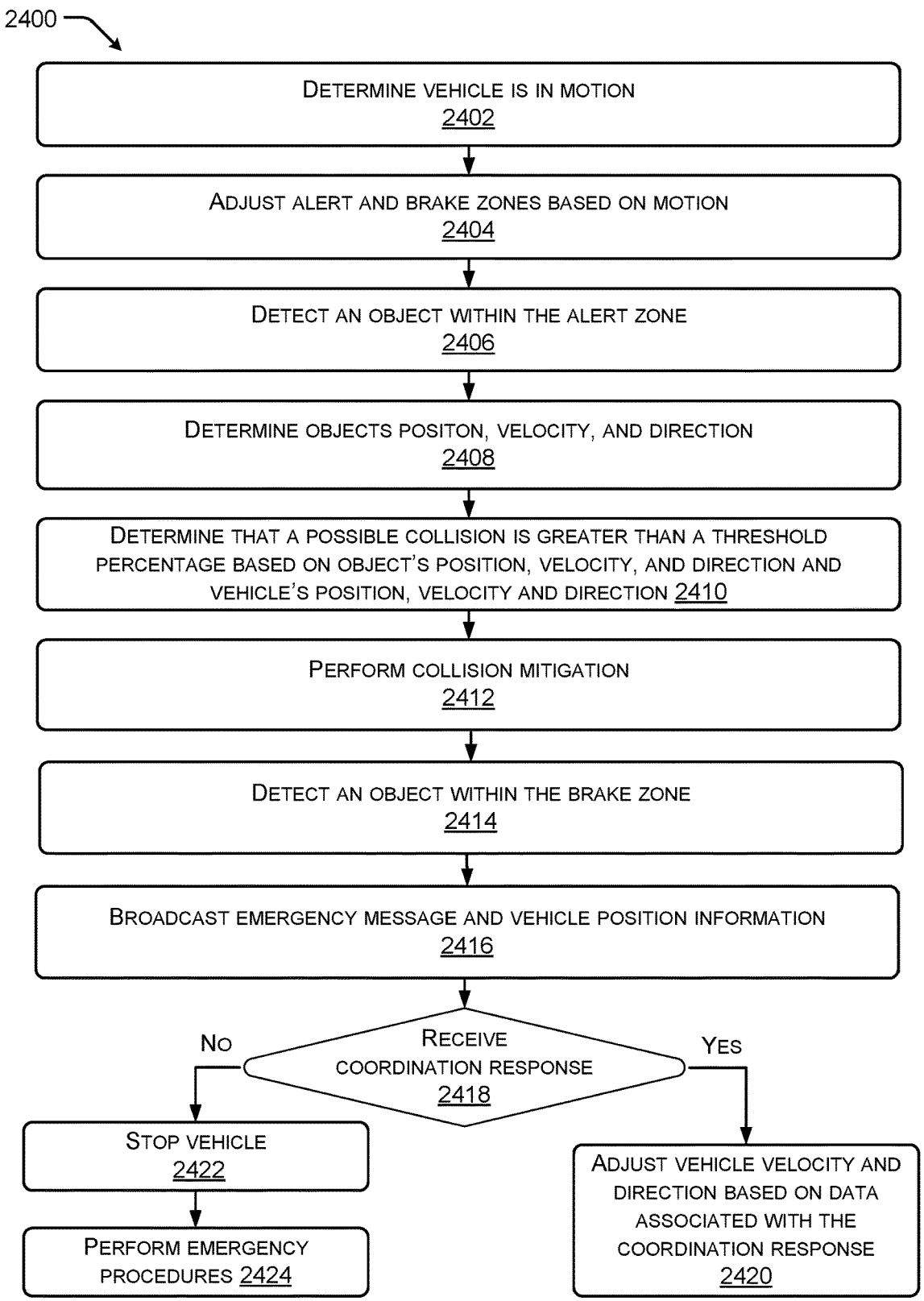
FIG. 24 is an example flow diagram showing an illustrative process for performing coordinated operations with a second vehicle according to some implementations.

FIG. 24 is an example flow diagram showing an illustrative process 2400 for performing coordinated operations with a second vehicle according to some implementations. For instance, in some situations, multiple vehicles may work in coordination to complete a task. For example, a tracker may pull a ripper to loosen hard rock or other material while a bulldozer removes the loosened material from the sub-region.

At 2402, the vehicle may determine that the vehicle is in motion. For example, the bulldozer may be following the tracker removing material that was loosened by the ripper implement on the tracker.

At 2404, the vehicle (e.g., the bulldozer) may set alert and brake zones based on motion (e.g., trajectory and velocity). For instance, in the current example, the bulldozer may increase the alert and brake zones in front of the vehicle as the vehicle is moving in a forward direction.

At 2406, the vehicle may detect an object with the alert zone. For example, a tracker may have experienced a reduction in speed if the ripper became stuck or the material increased in hardness.

At 2408, the vehicle may determine the object's (e.g., the tracker's) position, velocity and direction. For example, the vehicle may be collect data associated with the object using one or more sensors and calculate the object's position, velocity, and direction based on the sensor data and known information (e.g., velocity, trajectory, and navigation path) related to the vehicle itself.

At 2410, the vehicle may determine that a possibility of a collision is greater than a threshold percentage based on the object's position, velocity, and direction and the vehicle's position, velocity, and direction. In this example, the vehicle (e.g., the bulldozer) may determine that a collision is likely based on a shared trajectory and the velocity of both vehicles (e.g., the bulldozer will eventually overtake the tracker).

At 2412, the vehicle may perform collision mitigation. For instance, the vehicle may reduce velocity. The vehicle may also flash lights, sound a horn, notify a remote operator, etc. In one particular example, the vehicles may communicate via a specified communication channel. The vehicle (e.g., the excavator) may upon detecting the object (e.g., the rock truck) in the alert zone, transmit the warning message and vehicle position over the specified communication channel.

At 2414, the vehicle (e.g., the bulldozer) may detect the object (e.g., the tracker) within the brake zone. Again as the tracker is slowed by the material, the bulldozer may continue to gain on the tracker's position causing the tracker to enter the brake zone.

At 2416, the vehicle may broadcast an emergency message and vehicle position information. For example, the vehicle (e.g., the bulldozer) may upon detecting the object (e.g., the tracker) in the brake zone may transmit the emergency message and vehicle position over the specified communication channel.

At 2418, the vehicle (e.g., the excavator) determines if a coordination response is received from the object (e.g., the rock truck). If a coordination response is received, the process 2400 proceeds to 2420, and the vehicle may adjust velocity and direction based on the data associated with coordination response. For instance, the bulldozer may slow to substantially match the velocity of the tracker, thereby preventing a collision and continue the cooperative operation.

Otherwise, the process 2400 advances to 2422, and the vehicle comes to a stop. At 2424, the vehicle may perform additional emergency procedures. For instance, the vehicle may flash lights, notify the administrator system, notify the remote operator, sound a horn, etc. In some cases, the vehicle may provide a video feed to the administrator system or the remote operator.

Figure 25:
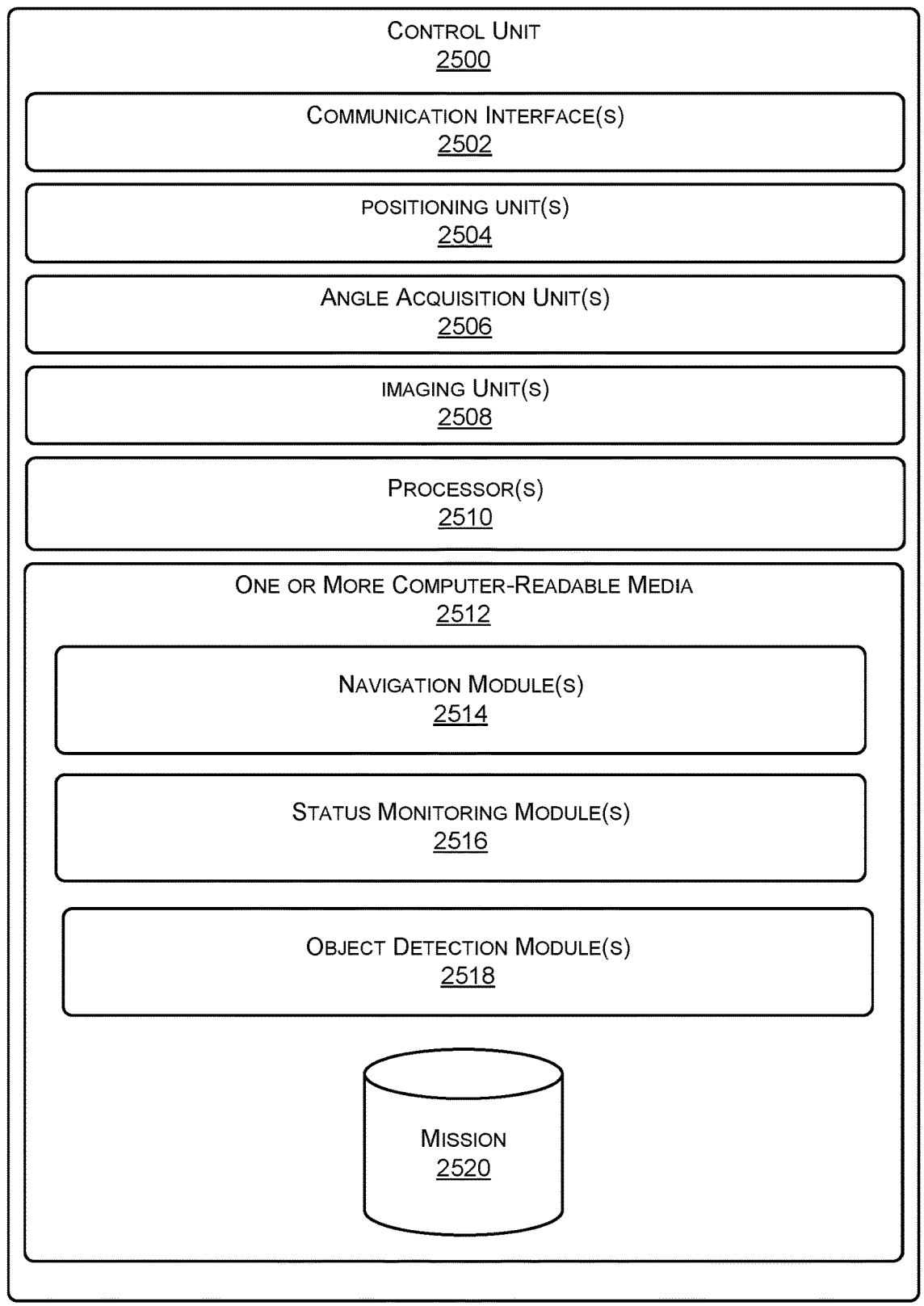
FIG. 25 illustrates example components of one or more servers associated with a control unit on an autonomous vehicle according to some implementations.

FIG. 25 illustrates example components of one or more servers associated with a control unit 2500 on an autonomous vehicle according to some implementations. In the illustrated example, the control unit 2500 may be coupled to or include one or more communication interfaces 2502. The control unit may also be coupled to or include one or more positioning units 2504, and one or more angle acquisition units 2506 and one or more imaging units 2508 for collecting data usable for autonomous control of a vehicle, monitoring of terrain, and/or detection of objects.

The communication interfaces 2502 may support both wired and wireless connection to various networks, such as cellular networks, radio networks (e.g., radio-frequency identification (RFID)), WiFi networks, short-range or near-field networks (e.g., Bluetooth®), infrared signals, local area networks, wide area networks, the Internet, and so forth. For example, the communication interfaces 2502 may allow the control unit 2500 to receive data, such as a navigation path or cutting profiles, from an administrator system or other remote control system.

The positioning units 2504 may include one or more sensor package combinations including GNSS sensors. In some cases, the positioning units 2504 may be disposed on the top of the vehicle body and include one or more antennas for receiving satellite signals and one or more receivers or other components for decoding the satellite signals and determining a global position of the positioning units 2504. In some cases, the satellite signals received by a GNSS sensor may be in various formats or standards, such as GPS, GLONASS, Galileo, BeiDou as well as other satellite navigation standards.

In some cases, the angle acquisition units 2506 may include one or more accelerometers, one or more gyroscopes, one or more magnetometers, and/or one or more pressure sensors, among others sensors. In one particular example, the angle acquisition units 2506 may include an internal measurement units (IMU) sensor or package. For instance, an IMU sensor or package may include three accelerometers placed orthogonally to each other, three rate gyroscopes placed orthogonally to each other, three magnetometers placed orthogonally to each other, and a barometric pressure sensor. In general, the angle acquisition units 2506 are configured to collect data associated with the movement, tilt, pitch, yaw, and acceleration of the vehicle during operation.

The imaging units 2508 may include one or more cameras or other image components usable to collect data associated with the surrounding environment. For example, the imaging units 2508 may include one or more lasers to project a grid onto a surface. The surface including the laser grid may be captured by an image component and processed to determine a surface of the environment. In some cases, the image components may also capture data that may be processed to determine the presence and identification of moving objects.

The control unit 2500 may also include processing resources, as represented by processors 2510, and computer-readable storage media 2512. The computer-readable storage media 2512 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instructions, data stores, and so forth may be stored within the computer-readable media 2512 and configured to execute on the processors 2510. For example, a navigation module 2514, a status monitoring module 2516, and an object detection module 2518. In some implementations, the computer-readable media 2512 may store data, such as missions 2520.

The navigation module 2514 may be configured to receive data associated with the environment from the various positioning units 2504, angle acquisition units 2506, and/or image units 2508 and to cause the vehicle to move and perform operations outlined in the mission 2520.

The status monitoring module 2516 may be configured to receive data associated with the environment from the various positioning units 2504, angle acquisition units 2506, and/or image units 2508 to determine the status of the vehicle and progress associated with the current task and overall mission.

The object detection module 2518 may be configured to receive data associated with the environment from the various positioning units 2504, angle acquisition units 2506, and/or image units 2508 to determine the presence of one or more objects within the detection zone, alert, zone and/or brake zone. The object detection module 2518 may then cause the vehicle to perform the collision mitigation, and broadcast the alert and emergency messages.

Figure 26:
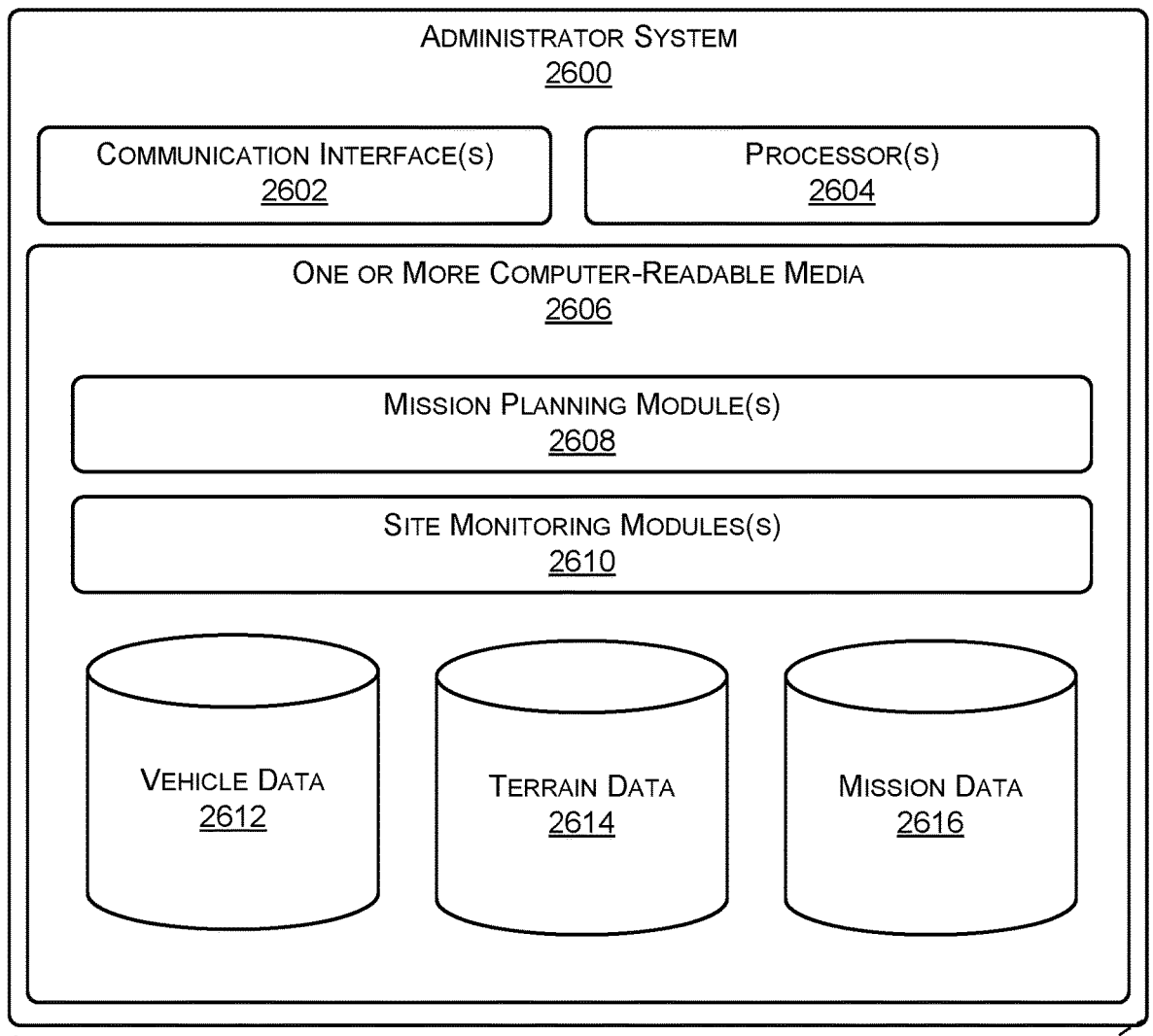
FIG. 26 illustrates example components of one or more servers associated with an administrator system according to some implementations.

FIG. 26 illustrates example components of one or more servers associated with an administrator system 2600 according to some implementations. The administrator system 2600 may be in communication with a control unit installed on a vehicle. In some cases, the administrator system 2600 may generate and send the mission to the vehicle to allow the vehicle to operate autonomously on the site.

In the illustrated example, the administrator system 2600 includes communication interfaces 2602 that may support both wired and wireless connection to various networks, such as cellular networks, radio networks (e.g., radio-frequency identification (RFID)), WiFi networks, short-range or near-field networks (e.g., Bluetooth®), infrared signals, local area networks, wide area networks, the Internet, and so forth. For example, the communication interfaces 2602 may exchange data, such as a mission, with the control unit or with a vehicle itself.

The administrator system 2600 may also include processing resources, as represented by processors 2604, and computer-readable storage media 2606. The computer-readable storage media 2606 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instructions, data stores, and so forth may be stored within the computer-readable media 2606 and configured to execute on the processors 2604. For example, a mission planning module 2608 and a site monitoring module 2610. In some implementations, the computer-readable media 2606 may store data, such as vehicle data 2612 and terrain data 2614, and/or mission data 2616. The vehicle data 2612 may include information known about the vehicle, such as power output range, driving speed range, working tool or implement capacity, vehicle dimensions, vehicle weight, ground pressure, range of steering radius, maintenance history, operation or task logs, location, current assignments, last repair visit, stored health, status, or operational data, among others. The terrain data 2614 may include information known about the terrain or location the vehicle is currently transforming. For example, the terrain data 2614 may include geological surveys and maps, ground type, height and elevation data, flora and fauna associated with the terrain, any improvements or obstacles associated with the terrain, current task being performed on the terrain (e.g., gravel production, mining, logging, etc.), vehicle list assigned to the terrain, boundaries, among others. The mission data 2616 may include information associated with the mission such as site plan, timeline, and finishing profiles.

The mission planning module 2608 may cause the administrator system 2600 to establish a communication channel with the vehicle or the remote database to retrieve the vehicle data 2612 and the terrain data 2614. For instance, the mission planning module 2608 may send diagnostic test instructions to the control unit on the vehicle to engage the navigation controls and collect data associated with the functionally of the vehicle and the current terrain. The mission planning module 2608 is also configured to generate the mission including the sub-regions, layers, paths, and segments based at least in part on the vehicle data 2612, the terrain data 2614, and the mission data 2616.

The site monitoring module 2610 may be configured to receive data from the vehicles as operations are performed and tasks are completed. The site monitoring module 2610 may update the mission based on the information received. For example, the site monitoring module 2610 may assign different vehicles to a task when the originally assigned vehicle experiences a malfunction or is otherwise prevented from completing the task.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   under control of one or more processors configured with executable instructions,
   receiving first survey data of a site at an administrator system;
   determining one or more sub-regions associated with the site based at least in part on the first survey data and a vehicle type;
   assigning one or more vehicles to individual sub-regions of the site, the assignment causing the one or more vehicles to begin operations, the one or more vehicles remote from the administrator system;
   for individual sub-regions:
      determining a desired finishing profile based at least in part on the first survey data;
      determining an operation type associated with the individual sub-region based at least in part on the first survey data;
      determining one or more layers associated with the individual sub-region based at least in part on the first survey data;
      determining at least one path parameter of one or more paths based at least in part on the one or more layers and one or more characteristics of an implement associated with a vehicle;
      determining one or more segments for individual layers and path combinations based at least in part on the one or more layers, the at least one path parameters of the one or more paths, and the one or more characteristics of the implement;
      defining one or more tasks for individual one of the one or more segments;
      assigning the one or more tasks to the vehicle;
   receiving, at the administrator system and from the vehicle, second survey data associated with the site;
   adjusting the one or more layers associated with the individual sub-region based at least in part on the second survey data;
   adjusting the at least one path parameter of the one or more paths based at least in part on the one or more adjusted layers;
   adjusting the one or more segments based at least in part on the one or more adjusted layers and the at least one adjusted path parameters;
   redefining the one or more tasks; and
   sending the one or more redefined tasks to the vehicle.

2. The method as recited in claim 1, wherein determining the one or more sub-regions comprises:
   identifying, by the one or more processors, outer boundaries of the site;
   identifying, by the one or more processors, restricted regions within the site;
   determining, by the one or more processors, an operation area based at least in part on the outer boundaries and the restricted regions; and
   determining, by the one or more processors, a total size of the operation area.

3. The method as recited in claim 2, wherein the operation area is the area within the outer boundaries minus an area associated with the restricted regions.

4. The method as recited in claim 1, wherein the first survey data is received from an aerial drone associated with at least one of the one or more vehicles.

5. The method as recited in claim 1, further comprising:
   receiving, from the one or more vehicles assigned to an individual task of the one or more tasks, progress data associated with the individual task;
   determining from the progress data that an actual terrain profile resulting after completion of the individual task differs from the desired cutting profile of the individual task by more than a threshold amount;
   adjusting one or more first task parameters associated with the individual task based at least in part on the progress data;
   adjusting one or more second task parameters associated with a subsequent task assigned based at least in part on the progress data; and
   sending the individual task and the subsequent task to the vehicle.

6. The method as recited in claim 5, wherein:
adjusting the one or more first task parameters associated with the task includes adjusting one or more second path parameters associated with the path of the layer and path combination; and
adjusting one or more second task parameters associated with the subsequent task includes adjusting one or more third path parameters associated with a second path adjacent to the path of the layer and path combination.

7. The method as recited in claim 5, wherein:
adjusting the one or more first task parameters associated with the task includes adjusting one or more first layer parameters associated with the layer of the layer and path combination; and
adjusting one or more parameters associated with the subsequent task includes adjusting one or more second layer parameters associated with a second layer adjacent to the layer of the layer and path combination.

8. An administrator system comprising:
one or more processors; and
a computer-readable media storing instructions, which when executed by the one or more processors, causes the one or more processor to performing actions including:
receiving data associated with a task of a mission being performed on a layer and a path from a vehicle assigned to a sub-region including the layer and the path prior to a completion of the task by the vehicle;
determining from the data that an actual terrain profile differs from a desired cutting profile by more than a threshold amount;
detecting, from the data and within the path, a terrain obstacle;
generating an updated mission by:
adjusting one or more parameters associated with the task based at least in part on the data;
designating at least a portion of the path associated with the terrain obstacle as restricted; and
adjusting one or more parameters associated with a subsequent task assigned based at least in part on the data received from the vehicle assigned to the sub-region including the layer and the path; and
sending the task and the subsequent task to the assigned vehicle.

9. The administrator system as recited in claim 8, wherein the subsequent task is associated with a second sub-region.

10. The administrator system as recited in claim 8, wherein adjusting the one or more parameters associated with the task includes adjusting a height of the layer.

11. The administrator system as recited in claim 8, wherein adjusting the one or more parameters associated with the task includes dividing the path into two or more segments.

12. The administrator system as recited in claim 8, wherein sending the updated mission to the vehicle includes sending the task to the vehicle and sending the subsequent task to a second vehicle different than the first vehicle.

13. A method comprising:
under control of one or more processors configured with executable instructions,
receiving data associated with a task of a mission being performed on a layer and a path from a vehicle assigned to a sub-region including the layer and the path, prior to the task being completed;
detecting from the data that an object is within an alert zone associated with the vehicle;
causing, in response to detecting the object within the alert zone, the vehicle to broadcast a warning message;
receiving additional data associated with the task of the mission being performed on the layer and the path from the vehicle;
determining from the additional data that the object has cleared the alert zone;
determining from the data and the additional data that a load on an implement of the vehicle exceeds a threshold amount;
generating an updated mission by:
adjusting one or more parameters associated with the task based at least in part on the data and the additional data;
adjusting one or more parameters associated with a subsequent task of the mission based at least in part on the data and the additional data; and
sending the updated mission to the vehicle.

14. The method as recited in claim 13, wherein adjusting the one or more parameters associated with the task includes adjusting a height of the layer.

15. The method as recited in claim 13, wherein sending the updated mission to the vehicle includes sending the task to the vehicle and sending the subsequent task to a second vehicle different than the first vehicle.

16. The method as recited in claim 1, further comprising ordering the one or more tasks to maintain a substantially even height across the sub-region, prior to sending the one or more task to the vehicle.

17. The method as recited in claim 1, wherein the first survey data is received from a database and the second survey data is collected by the vehicle.

18. The method as recited in claim 1, wherein the adjusting the one or more layers associated with the individual sub-region based at least in part on the second survey data includes identifying at least one restricted area.

19. The method as recited in claim 18, wherein the at least one restricted area is temporary.

20. The administrator system as recited in claim 8, wherein the terrain obstacle is at least one of an incline that is not navigable by the vehicle or a rock outcropping.

* * * * *